United States Patent
Chen et al.

(10) Patent No.: US 12,382,529 B2
(45) Date of Patent: Aug. 5, 2025

(54) TYPE OF RADIO BEARER CAUSING OPERATIONS IN WIRELESS COMMUNICATION

(71) Applicant: BUNKER HILL TECHNOLOGIES LLC, Allen, TX (US)

(72) Inventors: Yu Chen, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 324 days.

(21) Appl. No.: 18/097,468

(22) Filed: Jan. 16, 2023

(65) Prior Publication Data

US 2023/0232485 A1 Jul. 20, 2023

(30) Foreign Application Priority Data

Jan. 17, 2022 (CN) .......................... 202210047931.1

(51) Int. Cl.
*H04W 76/19* (2018.01)
*H04B 7/15* (2006.01)
(Continued)

(52) U.S. Cl.
CPC ........... *H04W 76/19* (2018.02); *H04W 40/22* (2013.01)

(58) Field of Classification Search
CPC ..... H04W 76/19; H04W 40/22; H04W 88/04; H04W 92/18; H04W 76/15; H04W 36/04; H04W 24/02; H04W 76/27; H04B 7/15
See application file for complete search history.

(56) References Cited

U.S. PATENT DOCUMENTS

2023/0023135 A1* 1/2023 Liu .................. H04W 4/00
2023/0070757 A1* 3/2023 Zheng ............. H04W 12/102
(Continued)

FOREIGN PATENT DOCUMENTS

CN 110022224 A 7/2019
CN 112437496 A 3/2021
(Continued)

OTHER PUBLICATIONS

First Office Action dated May 28, 2025, from the CN State Intellectual Property Office, for CN Patent Application 2022100479311. 1, 10 pgs.
(Continued)

*Primary Examiner* — Harry H Kim
(74) *Attorney, Agent, or Firm* — Ascenda Law Group, PC

(57) ABSTRACT

The present application discloses a method and a device for wireless communications, including detecting invalidation of a first bearer; the first bearer being associated with a first cell group; and as a response to the action of detecting invalidation of a first bearer, executing a first operation set, the first operation set being related to a type of the first bearer; and transmitting first information as a response to the action of detecting invalidation of a first bearer; the first information being used to indicate the invalidation of the first bearer; and transmitting a second message as a response to all conditions in a first condition set being satisfied; the second message indicating existence of available information. The present application helps network optimization by detecting invalidation of the first bearer and executing the first operation set, thus enhancing the communication reliability and avoiding interruption.

19 Claims, 7 Drawing Sheets

(51) Int. Cl.
*H04W 24/02* (2009.01)
*H04W 36/04* (2009.01)
*H04W 40/22* (2009.01)
*H04W 76/15* (2018.01)
*H04W 76/27* (2018.01)
*H04W 88/04* (2009.01)
*H04W 92/18* (2009.01)

(56) References Cited

U.S. PATENT DOCUMENTS

| | | | |
|---|---|---|---|
| 2023/0216649 A1* | 7/2023 | Liu | H04W 40/00 370/329 |
| 2024/0107360 A1* | 3/2024 | Tang | H04W 28/0268 |
| 2024/0260075 A1* | 8/2024 | Paladugu | H04W 76/14 |
| 2024/0324057 A1* | 9/2024 | Zhang | H04W 76/34 |

FOREIGN PATENT DOCUMENTS

| | | |
|---|---|---|
| WO | 2021056166 A1 | 4/2021 |
| WO | 2021095825 A1 | 5/2021 |

OTHER PUBLICATIONS

Search Report dated May 24, 2025, from the CN State Intellectual Property Office, for CN Patent Application 20221004793 11.1, 6 pgs.
"TP for 37.340—Introducing bearer harmonization", Ericsson, 3GPP TSG-RAN WG3 #98, Tdoc R3-1713434, Nov. 27-Dec. 1, 2017, Reno, NV, 49 pgs.

* cited by examiner

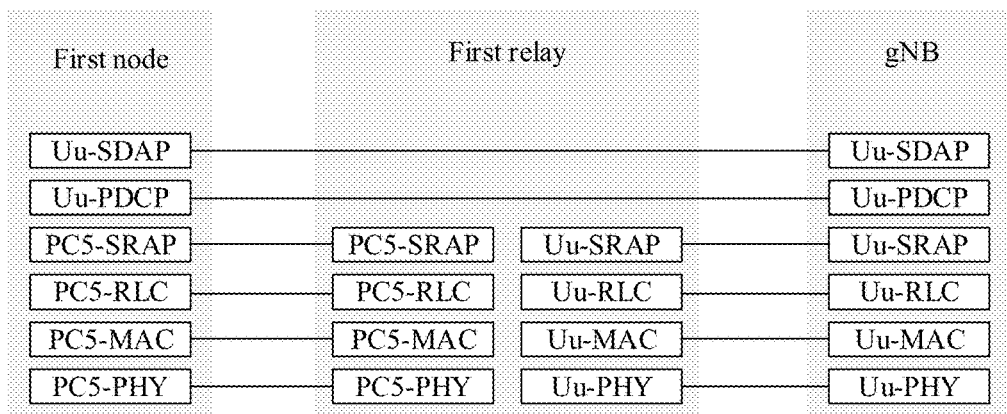
(a)
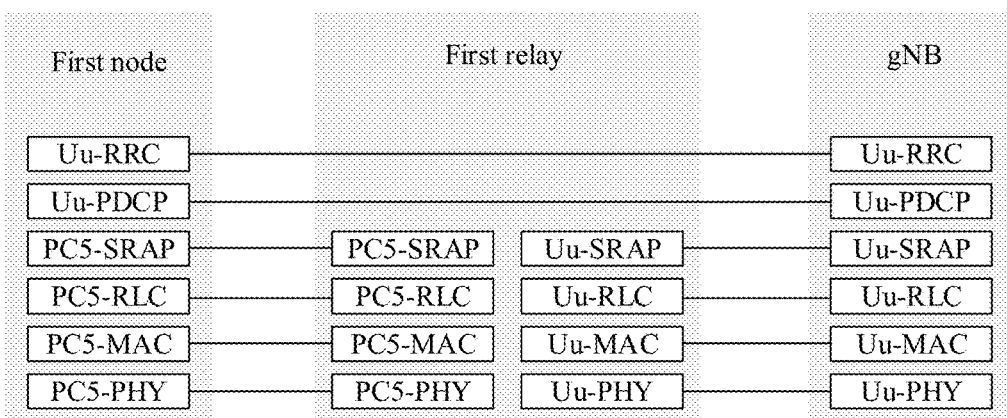
(b)
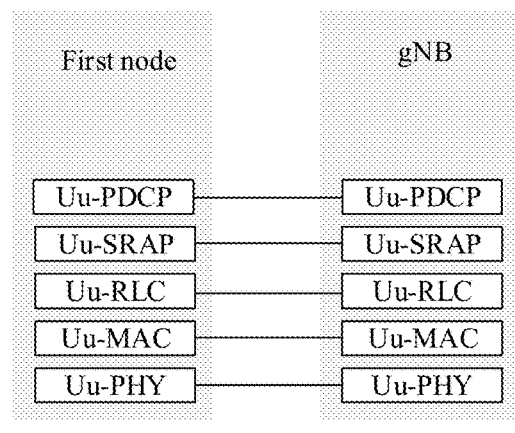
(c)
FIG. 7

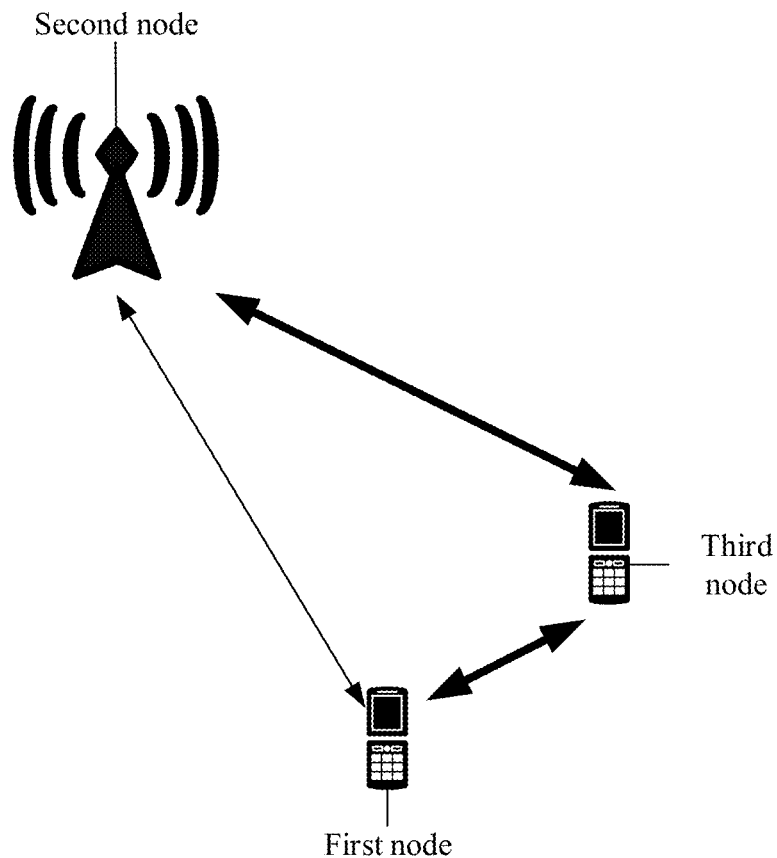

TYPE OF RADIO BEARER CAUSING OPERATIONS IN WIRELESS COMMUNICATION

CROSS REFERENCE TO RELATED APPLICATIONS

This application claims the priority benefit of Chinese Patent Application No. 202210047931.1, filed on Jan. 17, 2021, the full disclosure of which is incorporated herein by reference.

BACKGROUND

Technical Field

The present application relates to transmission methods and devices in wireless communication systems, in particular to a method and device in terms of network optimization in communications, enhancing quality of services, and relay communication.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involve correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications, of which the details can refer to:

https://www.3gpp.org/ftp/Specs/archive/38_series/38.211/38211-g60.zip
https://www.3gpp.org/ftp/Specs/archive/38_series/38.213/38213-g60.zip
https://www.3gpp.org/ftp/Specs/archive/38_series/38.331/38331-g60.zip

SUMMARY

The relay can be used in various communication scenarios, for instance, when a UE is at the edge of a cell, with poor coverage, it can be accessible to the network via the relay, where the relay node can be another UE. The relay generally includes L3 relay and L2 U2N relay, both of which provide the service of access to the network for a U2N remote UE via a relay node. The L3 relay is transparent to the access network, namely, a remote UE only establishes connection with the core network, so the access network cannot recognize whether data is from a remote node or a relay node; as for the L2 U2N relay, there is an RRC connection between a U2N remote UE and a Radio Access Network (RAN); the RAN can manage the remote UE and between them a radio bearer (RB) can be established. The relay can be another UE. In a system supporting L2 relay, the UE can be in communication with the network via a L2 U2N relay UE, that is, to use an indirect path, or can be directly in communication with the network without being relayed, that is, to use a direct path. In some scenarios, a UE can use a direct path and an indirect path at the same time for obtaining better reliability and higher throughput rate. The direct path and the indirect path play different roles in radio resource management and network optimization. For the direct path, if there occurs a case of invalidation that includes a radio link failure, it would be better to have corresponding operations such as recording or reporting failure information for the benefit of network optimization. As for the indirect path, for example if a link between a remote UE and its relay, namely, a sidelink is failed, the relay UE is not a fixed infrastructure that is friendly to optimization of the network, which makes the recording and reporting of corresponding failure information unnecessary. When a UE simultaneously uses a direct path and an indirect path, even if one path becomes invalid, for instance a radio link failure occurs, its communication with the network won't be failed as a result, in other words, the UE would be able to keep communication with a Master Cell Group (MCG) via the other path. In the existing technique, only when a failed direct path leads to failure of an MCG will the UE record information about the MCG failure, for instance, information related to a radio link failure on the direct path or information related to switch failure of the direct path, which will result in a problem, namely, when the UE can use a direct path and an indirect path simultaneously, even if the direct path is invalid, the fact that the indirect path still exists will make it less possible to fail an MCG, and if there is no MCG failure, nothing related to the invalidation of the direct path will be recorded. If afterwards the indirect path becomes invalid, it can be assumed that the MCG is failed, admittedly, but since at this time only the indirect path is still available, there won't be detailed records of failure information, let alone information about the previously invalid direct path, therefore, it is impossible to perform network optimization on scenarios with both a direct path and an indirect path, especially the optimization of the direct path. The solution proposed by the present application, of course, can also be used to solve other problems in the communication system apart from that presented above.

To address the problem presented above, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

detecting invalidation of a first bearer; the first bearer being associated with a first cell group; and as a response to the action of detecting invalidation of a first bearer, executing a first operation set, the first operation set being related to a type of the first bearer; and transmitting first information as a response to the action of detecting invalidation of a first bearer; the first information being used to indicate the invalidation of the first bearer; and transmitting a second message as a response to all conditions in a first condition set being satisfied; the second message indicating existence of available information;

herein, the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, a problem to be solved in the present application includes: how to optimize the network in scenarios using L2 relay, particularly when a direct path and an indirect path are used at the same time, and how to record and report information correspondingly to assist in network optimization especially after the direct path and the indirect path are invalid in succession.

In one embodiment, an advantage of the above method includes: supporting the use of L2 relay for network optimization, especially in the case when both a direct path and an indirect path are used in optimizing the network, which helps reduce interruptions in communications, enhance the quality of services and coverage, thus providing more support to mobility and service continuity.

Specifically, according to one aspect of the present application, transmitting the first information on a second bearer; the second bearer being associated with the first cell group; one of the first bearer and the second bearer is the first-type bearer while the other is the second-type bearer;

herein, an RLC entity associated with the first-type bearer is an RLC entity of a Uu interface; an RLC entity associated with the second-type bearer is an RLC entity of a PC5 interface; the first-type bearer uses a primary link; the second-type bearer uses a sidelink.

Specifically, according to one aspect of the present application, a signaling radio bearer 1 (SRB1) of the first node is simultaneously associated with the first bearer and the second bearer; the first node is only configured with one cell group.

Specifically, according to one aspect of the present application, the first operation set comprises reconfiguring medium access control (MAC) associated with the first bearer; the first-type bearer is an RLC bearer, while the second-type bearer is a sidelink RLC bearer.

Specifically, according to one aspect of the present application, the first bearer is the first-type bearer; the action of storing information for the invalidation of the first bearer in the first state variable comprises storing a cause of the invalidation of the first bearer and whether a second-type bearer is used; the cause of the invalidation of the first bearer belongs to a first candidate cause set, the first candidate cause set comprising a radio link failure (RLF), a cell handover failure (HOF) and a path switch failure.

Specifically, according to one aspect of the present application, receiving a first signaling, the first signaling being used to configure a second bearer; one of the first bearer and the second bearer is the first-type bearer while the other is the second-type bearer; the second bearer being associated with the first cell group;

before transmitting the first information, a primary path of a PDCP entity of an SRB1 is configured as for the second bearer;

herein, the first signaling indicates that an SRB1 is simultaneously associated with the first bearer and the second bearer, and that a primary path of the PDCP entity of the SRB1 is for the first bearer;

the SRB1 is not configured with PDCP duplication; the first information comprises a first measurement result; the first information is used to indicate whether the first bearer is the second-type bearer.

Specifically, according to one aspect of the present application, receiving a first signaling, the first signaling being used to configure a second bearer; the second bearer being associated with the first cell group; and detecting invalidation of the second bearer after the action of detecting the invalidation of the first bearer; and as a response to the action of detecting the invalidation of the second bearer, initiating an RRC re-establishment procedure, and suspending an SRB1 along with the RRC re-establishment procedure, and performing either cell selection or relay selection; and transmitting a third message, the third message being used to indicate the invalidation of the second bearer;

herein, the first bearer is the first-type bearer; the second bearer is the second-type bearer; while the invalidation of the second bearer is detected, the first bearer is not yet resumed; an RLC entity associated with the first-type bearer is an RLC entity of a Uu interface; an RLC entity associated with the second bearer is an RLC entity of a PC5 interface.

Specifically, according to one aspect of the present application, receiving a first signaling, the first signaling being used to configure a second bearer; the second bearer being associated with the first cell group; and detecting invalidation of the second bearer after the action of detecting the invalidation of the first bearer; and as a response to the action of detecting the invalidation of the second bearer, initiating an RRC re-establishment procedure, and suspending an SRB1 along with the RRC re-establishment procedure, and performing either cell selection or relay selection; and transmitting a third message, the third message being used to indicate the invalidation of the second bearer;

herein, the first bearer is the second-type bearer; the second bearer is the first-type bearer; while the invalidation of the second bearer is detected, the first bearer is not yet resumed; an RLC entity associated with the first-type bearer is an RLC entity of a Uu interface; an RLC entity associated with the second bearer is an RLC entity of a PC5 interface.

Specifically, according to one aspect of the present application, as a response to the action of detecting the invalidation of the first bearer, transmitting the first information depending on whether the first bearer is the first-type bearer or the second-type bearer;

herein, the sentence of transmitting the first information depending on whether the first bearer is the first-type bearer or the second-type bearer means that: when the first bearer is the first-type bearer, initiating a failure information transmission procedure, the action of initiating the failure information transmission procedure including transmitting the first information; when the first bearer is the second-type bearer, initiating a transmission procedure of sidelink UE information for NR sidelink communication, the action of initiating the transmission procedure of sidelink UE information for NR sidelink communication including transmitting the first information.

Specifically, according to one aspect of the present application, the first node is a terminal of Internet of Things (IoT).

Specifically, according to one aspect of the present application, the first node is a relay.

Specifically, according to one aspect of the present application, the first node is a U2N remote UE.

Specifically, according to one aspect of the present application, the first node is a vehicle-mounted terminal.

Specifically, according to one aspect of the present application, the first node is an aircraft.

Specifically, according to one aspect of the present application, the first node is a cellphone.

Specifically, according to one aspect of the present application, the first node is a communication terminal supporting multi-SIM communications.

The present application provides a first node for wireless communications, comprising:

a first receiver, detecting invalidation of a first bearer; the first bearer being associated with a first cell group; and as a response to the action of detecting invalidation of a first bearer, executing a first operation set, the first operation set being related to a type of the first bearer; and a first transmitter, transmitting first information as a response to the action of detecting invalidation of a first bearer; the first information being used to indicate the invalidation of the first bearer; and transmitting a second message as a response to all conditions in a first condition set being satisfied; the second message indicating existence of available information;

herein, the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, compared with the prior art, the present application is advantageous in the following aspects:

supporting network optimization with relay, especially when using a L2 UE to Network (U2N) relay UE, for instance, providing rich and accurate information relevant to bearer invalidation that occurs during the L2 U2N relaying.

supporting network optimization based on the invalidation of one of a direct path and an indirect path that are configured simultaneously, particularly in a case when the direct path firstly becomes invalid and not yet resumed, and the indirect path begins to lose validity, even with exact information of how the direct path becomes invalid being recorded.

providing more accurate and detailed records of how a path becomes invalid, i.e., recording both information about the path invalidation and the usage of the indirect path, to the benefit of performing precise, more targeted network optimization.

supporting the practice of using a direct path and an indirect path simultaneously, where only when both paths are failed, namely, when there is no path available will a cell group be assumed as failed, thus enhancing the reliability of communication.

BRIEF DESCRIPTION OF THE DRAWINGS

Other features, objects and advantages of the present application will become more apparent from the detailed description of non-restrictive embodiments taken in conjunction with the following drawings:

FIG. 7 illustrates a schematic diagram of a protocol stack of relay communications according to one embodiment of the present application.

FIG. 8 illustrates a schematic diagram of a topological structure according to one embodiment of the present application.

FIG. 9 illustrates a schematic diagram of first information being used to indicate invalidation of a first bearer according to one embodiment of the present application.

FIG. 10 illustrates a schematic diagram of first information being used to indicate whether a first bearer is a second-type bearer according to one embodiment of the present application.

FIG. 11 illustrates a schematic diagram of a third message being used to indicate invalidation of a second bearer according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
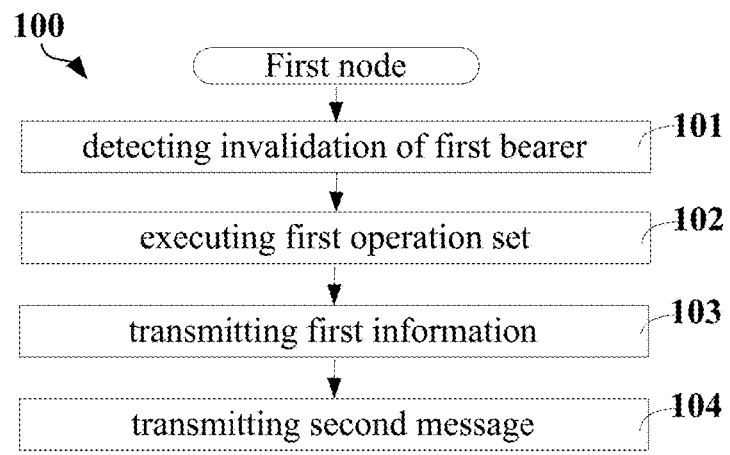
FIG. 1 illustrates a flowchart of detecting invalidation of a first bearer, executing a first operation set, transmitting first information and transmitting a second message according to one embodiment of the present application.

Embodiment 1 illustrates a flowchart of detecting invalidation of a first bearer, executing a first operation set, transmitting first information and transmitting a second message according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application detects invalidation of a first bearer in step 101, and executes a first operation set in step 102, transmits first information in step 103, and transmits a second message in step 104;

herein, the first bearer is associated with a first cell group; and as a response to the action of detecting invalidation of a first bearer, executing a first operation set, the first operation set being related to a type of the first bearer; and the first node, transmitting first information as a response to the action of detecting invalidation of a first bearer; the first information is used to indicate the invalidation of the first bearer, and as a response to all conditions in a first condition set being satisfied, transmitting a second message; the second message indicating existence of available information;

the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, the first node is a User Equipment (UE).

In one embodiment, the direct path refers to a UE-to-Network (U2N) transmission path, so transmitting through the direct path means that data is transmitted without being relayed between a remote UE and the network in U2N transmission.

In one subembodiment, the data comprises higher-layer data and signaling.

In one subembodiment, the data comprises an RRC signaling.

In one subembodiment, the data comprises a bit string or a bit block.

In one subembodiment, the data only comprises signaling or data borne by a radio bearer (RB).

In one embodiment, the indirect path refers to a UE-to-Network (U2N) transmission path, so transmitting through the indirect path means that data is forwarded by a U2N relay UE between a remote UE and the network in U2N transmission.

In one subembodiment, the data comprises higher-layer data and signaling.

In one subembodiment, the data comprises an RRC signaling.

In one subembodiment, the data comprises a bit string or a bit block.

In one subembodiment, the data only comprises signaling or data borne by a radio bearer (RB).

In one embodiment, a radio link is either the direct path or the indirect path.

In one embodiment, a U2N relay UE refers to a UE providing the function of supporting connections between a U2N remote UE and the network.

In one embodiment, a U2N remote UE refers to a UE that needs to be relayed by a U2N relay UE in communications with the network.

In one embodiment, a U2N remote UE refers to a UE that needs to be relayed by a U2N relay UE in communications with the network.

In one embodiment, a U2N remote UE refers to a UE in communications with the network that supports relaying traffics.

In one embodiment, a U2N relay is a U2N relay UE.

In one embodiment, when transmitting to and receiving from the network unicast traffics, the U2N relay and the U2N remote node are both in an RRC connected state.

In one embodiment, when the U2N remote UE is in an RRC Idle state or an RRC Inactive state, the U2N relay UE can be in any RRC state, i.e., RRC Connected state, RRC Idle state or RRC Inactive state.

In one embodiment, not transmitting through a direct path is equivalent to transmitting through an indirect path.

In one embodiment, not transmitting through a direct path includes transmitting via a relay.

In one embodiment, transmitting through a direct path is or includes not transmitting via a relay.

In one embodiment, transmitting through a direct path is or includes not forwarding via a relay.

In one embodiment, the U2N relay UE is a UE providing the functionality of supporting connectivity to the network for the U2N remote UE.

In one subembodiment, the U2N relay UE is a UE.

In one subembodiment, the U2N relay UE provides the U2N remote UE with the service of relay to the network.

In one embodiment, the U2N remote UE is a UE in communication with the network via the U2N relay UE.

In one embodiment, a direct mode is a mode using the direct path.

In one embodiment, the direct mode is a mode in which a U2N remote UE is in communication with the network using the direct path.

In one embodiment, the direct mode is a mode in which a U2N remote UE transmits an RRC signaling or establishes an RRC connection to the network using the direct path.

In one embodiment, an indirect mode is a mode using the indirect path.

In one embodiment, the indirect mode is a mode using the indirect path.

In one embodiment, the indirect mode is a mode in which a U2N remote UE is in communication with the network using the indirect path.

In one embodiment, the indirect mode is a mode in which a U2N remote UE transmits an RRC signaling or establishes an RRC connection to the network using the indirect path.

In one embodiment, a serving cell is or includes a cell that the UE is camped on. Performing cell search includes that the UE searches for a suitable cell for a selected Public Land Mobile Network (PLMN) or Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resume a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a U2N remote node, a serving cell is or includes a cell which the U2N relay is camped on or is connected with.

In one embodiment, for a UE in RRC connected state without being configured with carrier aggregation/dual connectivity (CA/DC), there is only one serving cell that comprises a primary cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with E-UTRA and an NR node, or between two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an SCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, an Access Stratum (AS) functionality that enables Vehicle-to Everything (V2X) communications defined in 3GPP TS 23.285 is V2X sidelink communication, where the V2X sidelink communication occurs between nearby UEs, using E-UTRA techniques but not traversing network nodes.

In one embodiment, an Access Stratum (AS) functionality that at least enables Vehicle-to Everything (V2X) communications defined in 3GPP TS 23.287 is NR sidelink communication, where the NR sidelink communication occurs between two or more nearby UEs, using NR technology but not traversing network nodes.

In one embodiment, the sidelink refers to a UE-to-UE direct communication link that uses sidelink resource allocation mode, a physical signal or channel, and physical layer procedures.

In one embodiment, not being or not located within coverage is equivalent to being out of coverage.

In one embodiment, being within coverage is equivalent to being covered.

In one embodiment, being out of coverage is equivalent to being uncovered.

In one embodiment, the first node is a U2N remote node.

In one embodiment, PDCP entities corresponding to radio bearers (RBs) terminated between a UE and the network are respectively located within the UE and the network.

In one embodiment, the direct path refers to a communication link or channel or bearer used for the direct-path transmission.

In one embodiment, the direct-path transmission means that data borne by at least Signaling radio bearer (SRB) between the UE and network does not go through relaying or forwarding of other nodes.

In one embodiment, the direct-path transmission means that RLC bearers associated with at least Signaling radio bearer (SRB) between the UE and network are respectively terminated at the UE and the network.

In one embodiment, the direct-path transmission means that RLC entities associated with at least Signaling radio bearer (SRB) between the UE and network are respectively terminated at the UE and the network.

In one embodiment, the direct-path transmission means that there is a direct communication link between the UE and the network.

In one embodiment, the direct-path transmission means that there is a Uu interface between the UE and the network.

In one embodiment, the direct-path transmission means that there is a MAC layer of a Uu interface, and the MAC layer of the Uu interface carries an RRC signaling.

In one embodiment, the direct-path transmission means that there is a physical layer of a Uu interface between the UE and the network.

In one embodiment, the direct-path transmission means that there is a logical channel and/or a transport channel between the UE and the network.

In one embodiment, the indirect path refers to an indirect path or communication link or channel or bearer used for the indirect-path transmission.

In one embodiment, the indirect-path transmission means that data borne by at least Signaling radio bearer (SRB) between the UE and network goes through relaying or forwarding of other nodes.

In one embodiment, the indirect-path transmission means that RLC bearers associated with at least Signaling radio bearer (SRB) between the UE and network are respectively terminated at the UE and the other node, as well as the other node and the network.

In one embodiment, the indirect-path transmission means that RLC entities associated with at least Signaling radio bearer (SRB) between the UE and network are respectively terminated at the UE and the other node, as well as the other node and the network.

In one embodiment, the phrase of at least SRB includes at least one of {SRB0, SRB1, SRB2, SRB3}.

In one embodiment, the phrase of at least SRB includes both an SRB and a data radio bearer (DRB).

In one embodiment, the indirect-path transmission means that there is no direct communication link between the UE and the network.

In one embodiment, the indirect-path transmission means that there isn't a MAC layer of a Uu interface between the UE and the network.

In one embodiment, the indirect-path transmission means that there isn't a physical layer of a Uu interface between the UE and the network.

In one embodiment, the indirect-path transmission means that there is neither a logical channel nor a transport channel between the UE and the network.

In one embodiment, the network includes a Radio Access Network (RAN) and/or a serving cell and/or a base station.

In one embodiment, the UE in the phrase of the UE and the network includes the first node.

In one embodiment, the other nodes include a relay node or other UE.

In one embodiment, when using a direct path for transmission, the UE can transmit a physical layer signaling to the network; when using an indirect path for transmission, the UE cannot transmit or directly transmit a physical layer signaling to the network.

In one embodiment, when using a direct path for transmission, the UE can transmit a MAC CE to the network; when using an indirect path for transmission, the UE cannot transmit or directly transmit a MAC CE to the network.

In one embodiment, when using a direct path for transmission, there isn't any other protocol layer between a PDCP layer and an RLC layer of the first node; when using an indirect path for transmission, there is at least one other protocol layer between a PDCP layer and an RLC layer of the first node.

In one subembodiment, the other protocol layer is or includes an adaptation layer.

In one embodiment, when using a direct path for transmission, the network directly schedules uplink transmission of the first node via DCI; when using an indirect path for transmission, the network does not directly schedule uplink transmission of the first node via DCI.

In one embodiment, when using a direct path for transmission, an SRB of the first node is associated with an RLC entity and/or an RLC layer and/or an RLC bearer; when using an indirect path for transmission, an SRB of the first node is associated with an RLC entity of a PC5 interface.

In one embodiment, when using a direct path for transmission, a mapping relation exists between an SRB of the first node and an RLC entity of a Uu interface; when using an indirect path for transmission, a mapping relation exists between an SRB of the first node and an RLC entity of a PC5 interface.

In one embodiment, there exist(s) a direct path and/or an indirect path between the first node and the network.

In one embodiment, transiting from a direct path to an indirect path means: starting to use an indirect path and stopping using a direct path.

In one embodiment, transiting from a direct path to an indirect path means: starting to use an indirect path for transmission and stopping using a direct path for transmission.

In one embodiment, transiting from a direct path to an indirect path means: turning a direct-path transmission into an indirect-path transmission.

In one embodiment, transiting from a direct path to an indirect path means: the first node associates an SRB with an RLC entity of a PC5 interface and meanwhile releases an RLC entity of a Uu interface associated with the SRB.

In one embodiment, transiting from a direct path to an indirect path means: the first node associates an SRB and a DRB with an RLC entity of a PC5 interface and meanwhile releases an RLC entity of a Uu interface associated with the SRB and the DRB.

In one embodiment, transiting from an indirect path to a direct path means: starting to use a direct path and stopping using an indirect path.

In one embodiment, transiting from an indirect path to a direct path means: starting to use a direct path for transmission and stopping using an indirect path for transmission.

In one embodiment, transiting from an indirect path to a direct path means: turning an indirect-path transmission into a direct-path transmission.

In one embodiment, transiting from an indirect path to a direct path means: the first node releases an RLC entity of a PC5 interface associated with an SRB, and meanwhile associates the SRB with an RLC entity of a Uu interface.

In one embodiment, transiting from an indirect path to a direct path means: the first node releases all RLC entities of a PC5 interface associated with a DRB, and meanwhile associates the DRB with an RLC entity of a Uu interface.

In one embodiment, the first node supports a transition from a direct path to an indirect path.

In one embodiment, when the first node uses an indirect path, a relay used for the indirect path is a first relay.

In one embodiment, the relay in the present application is a U2N relay UE.

In one embodiment, the first node is in an RRC connected state.

In one embodiment, the first node in the present application does not use dual connectivity (DC).

In one embodiment, the first node in the present application is not configured with dual connectivity (DC).

In one embodiment, the first node in the present application has only one cell group.

In one embodiment, the first node in the present application has only one cell group, i.e., an MCG.

In one embodiment, the first node in the present application is not configured with an SCG.

In one embodiment, the relay in the present application is a L2 U2N relay UE.

In one embodiment, the first node in the present application uses a direct path and an indirect path simultaneously.

In one embodiment, the first-type bearer is a direct path; the second-type bearer is an indirect path.

In one embodiment, the first-type bearer is an indirect path; the second-type bearer is a direct path.

In one embodiment, the first-type bearer is an RLC bearer; the second-type bearer is a PC5 RLC bearer.

In one embodiment, the first-type bearer is a Uu RLC bearer; the second-type bearer is a PC5 RLC bearer.

In one embodiment, the first-type bearer is a primary link radio link; the second-type bearer is a sidelink radio link.

In one embodiment, the first-type bearer is a DRB; the second-type bearer is an MRB.

In one embodiment, the first-type bearer is an SRB; the second-type bearer is a DRB.

In one embodiment, the first-type bearer is an SRB; the second-type bearer is an MRB.

In one embodiment, the first-type bearer is an MRB; the second-type bearer is a DRB or SRB.

In one embodiment, the first-type bearer is a radio link between the first node and the first cell group; the second-type bearer is a sidelink radio link between the first node and a L2 U2N relay UE and the L2 U2N relay UE is a L2 U2N relay between the first node and the first cell group.

In one embodiment, the first-type bearer and the second-type bearer are both bearers for an AS.

In one embodiment, one of the first-type bearer and the second-type bearer is a bearer for an AS and the other is a bearer for a Non-Access Stratum (NAS).

In one subembodiment, the first-type bearer is an AS bearer, while the second-type bearer is a NAS bearer.

In one subembodiment, the second-type bearer is an AS bearer, while the first-type bearer is a NAS bearer.

In one embodiment, the first-type bearer is a channel in a primary link, while the second-type bearer is a channel in a sidelink.

In one subembodiment, the primary link is a link between the first node and the first cell group or a base station of the first cell group without being relayed.

In one embodiment, the first-type bearer is a physical channel in a primary link, while the second-type bearer is a physical channel in a sidelink.

In one subembodiment, the primary link is a link between the first node and the first cell group or a base station of the first cell group without being relayed.

In one embodiment, the first-type bearer is a transport channel in a primary link, while the second-type bearer is a transport channel in a sidelink.

In one subembodiment, the primary link is a link between the first node and the first cell group or a base station of the first cell group without being relayed.

In one embodiment, the first-type bearer is a logical channel in a primary link, while the second-type bearer is a logical channel in a sidelink.

In one subembodiment, the primary link is a link between the first node and the first cell group or a base station of the first cell group without being relayed.

In one embodiment, the first bearer is a direct path.

In one embodiment, the first bearer is an indirect path.

In one embodiment, the first bearer is a radio bearer.

In one embodiment, the first bearer is an RLC bearer.

In one embodiment, the first bearer is a sidelink RLC bearer.

In one embodiment, the first bearer is a unicast bearer.

In one embodiment, the first bearer is a broadcast or multicast or groupcast bearer.

In one embodiment, the first bearer is a radio link.

In one embodiment, the first bearer is a sidelink.

In one embodiment, the first bearer is a communication link.

In one embodiment, the first bearer is a channel.

In one embodiment, the first bearer is a network channel.

In one embodiment, the first bearer belongs to an Access Stratum (AS).

In one embodiment, the first bearer is a radio link between the first node and the first cell group.

In one embodiment, the first bearer is a sidelink radio link between the first node and a L2 U2N relay UE, and the first bearer is associated with at least one of a DRB or an SRB or an MRB of the first node, and the DRB or the SRB or the MRB is a radio bearer between the first node and the first cell group.

In one embodiment, the first bearer is a sidelink radio link between the first node and a L2 U2N relay UE, and the first bearer is used for transmitting a PDCP PDU for the first cell group.

In one embodiment, the first bearer is a direct unicast link between the first node and a L2 U2N relay UE, and the direct unicast link is used for transmitting data between the first node and the first cell group.

In one embodiment, the phrase of invalidation of the first bearer means that a radio link failure occurs in the first bearer.

In one embodiment, the phrase of invalidation of the first bearer means that a sidelink radio link failure occurs in the first bearer.

In one embodiment, the phrase of invalidation of the first bearer means that a failure occurs in the first bearer.

In one embodiment, the phrase of invalidation of the first bearer means that an irrecoverable failure occurs in the first bearer.

In one embodiment, the phrase of invalidation of the first bearer means that the first bearer cannot continue to be used.

In one embodiment, the phrase of invalidation of the first bearer means that the first bearer must be released or suspended.

In one embodiment, the phrase of invalidation of the first bearer means that a link to which the first bearer belongs is failed.

In one embodiment, the phrase of invalidation of the first bearer means that the first bearer is invalid or illicit.

In one embodiment, the phrase of invalidation of the first bearer means that it is necessary to stop using the first bearer.

In one embodiment, the phrase of invalidation of the first bearer means that it is necessary to stop transmitting data on the first bearer.

In one embodiment, the phrase of invalidation of the first bearer means that it is necessary to stop receiving data on the first bearer.

In one embodiment, the phrase of invalidation of the first bearer means that it is necessary to stop transmitting data on the first bearer, but it is allowable to continue receiving data on the first bearer.

In one embodiment, the phrase of invalidation of the first bearer means that it is necessary to release a direct unicast link related to the first bearer.

In one embodiment, the first cell group is an MCG.

In one embodiment, the first cell group only comprises a PCell.

In one embodiment, the first cell group comprises a PCell and at least one SCell.

In one embodiment, the phrase of the first bearer being associated with a first cell group means that: the first bearer is a bearer between the first node and the first cell group.

In one embodiment, the phrase of the first bearer being associated with a first cell group means that: the first bearer is terminated at the first node and the first cell group.

In one embodiment, the phrase of the first bearer being associated with a first cell group means that: the first bearer is terminated at the first node and a base station of the first cell group.

In one embodiment, the phrase of the first bearer being associated with a first cell group means that: PDCP entities corresponding to the first bearer are respectively in the first node and the first cell group.

In one embodiment, the phrase of the first bearer being associated with a first cell group means that: RLC entities corresponding to the first bearer are respectively in the first node and the first cell group.

In one embodiment, the phrase of the first bearer being associated with a first cell group means that: MAC corresponding to or used by or mapped to the first bearer is for the first cell group.

In one embodiment, the phrase of the first bearer being associated with a first cell group means that: the first bearer is used for transmitting a PDCP PDU between the first node and the first cell group.

In one embodiment, the phrase of the first bearer being associated with a first cell group means that: the first bearer is used for transmitting a PDCP SDU between the first node and the first cell group.

In one embodiment, the phrase of the first bearer being associated with a first cell group means that: the first bearer is used for transmitting an RLC PDU between the first node and the first cell group.

In one embodiment, the phrase of the first bearer being associated with a first cell group means that: the first bearer is used for transmitting a MAC PDU between the first node and the first cell group.

In one embodiment, the phrase of the first bearer being associated with a first cell group means that: the first bearer is used for transmitting data for the first cell group.

In one embodiment, the phrase of the first bearer being associated with a first cell group means that: at least SRB1 between the first node and the first cell group uses the first bearer.

In one embodiment, the phrase of the first bearer being associated with a first cell group means that: there is a mapping relation between at least an SRB1 between the first node and the first cell group and the first bearer.

In one embodiment, the phrase of the first bearer being associated with a first cell group means that: the first bearer is a bearer between the first node and a L2 U2N relay UE, the L2 U2N relay UE being a relay between the first node and the first cell group.

In one embodiment, the phrase of the first bearer being associated with a first cell group means that: the first bearer is a bearer between the first node and a L2 U2N relay UE, the L2 U2N relay UE forwarding data between the first node and the first cell group.

In one embodiment, the phrase of the first bearer being associated with a first cell group means that: the first bearer is an RLC bearer between the first node and a L2 U2N relay UE, the L2 U2N relay UE being a relay between the first node and the first cell group.

In one embodiment, the phrase of the first bearer being associated with a first cell group means that: the first bearer is an RLC bearer between the first node and a L2 U2N relay UE, the L2 U2N relay UE forwarding data between the first node and the first cell group.

In one embodiment, the phrase of the first bearer being associated with a first cell group means that: the first bearer is a sidelink radio link between the first node and a L2 U2N relay UE, the L2 U2N relay UE being a relay between the first node and the first cell group.

In one embodiment, the phrase of the first bearer being associated with a first cell group means that: the first bearer is a sidelink radio link between the first node and a L2 U2N relay UE, the L2 U2N relay UE forwarding data between the first node and the first cell group.

In one embodiment, the phrase of the first bearer being associated with a first cell group means that: the first bearer is an RLC bearer between the first node and a L2 U2N relay UE, the first bearer used for bearing at least the SRB1, the at least SRB1 being an SRB between the first node and the first cell group.

In one embodiment, the first operation set comprises at least one operation.

In one embodiment, the second message is an RRC message.

In one embodiment, the second message is used for indicating that an operation on an RRC layer is completed.

In one embodiment, the second message comprises RRCReconfigurationComplete.

In one embodiment, the second message comprises RRCResumeComplete.

In one embodiment, the second message comprises RRCSetupComplete.

In one embodiment, the second message comprises RRCReestablishmentComplete.

In one embodiment, the phrase of the second message indicating existence of available information means that: the first node has or has stored available information.

In one embodiment, the phrase of the second message indicating existence of available information means that: the available information comprises information of the invalidation of the first bearer.

In one embodiment, the phrase of the second message indicating existence of available information means that: the available information comprises information of the invalidation of the first-type bearer.

In one embodiment, the phrase of the second message indicating existence of available information means that: the available information comprises information of a radio link failure.

In one embodiment, the phrase of the second message indicating existence of available information means that: the available information comprises information of a cell handover failure.

In one embodiment, the phrase of the second message indicating existence of available information means that: the available information comprises information of a path switch failure.

In one embodiment, the phrase of the second message indicating existence of available information means that: the second message comprises an enumeration field with a value of true for indicating the existence of available information.

In one embodiment, the phrase of the second message indicating existence of available information means that: the second message comprises a field whose name includes available and with a value of true for indicating the existence of available information.

In one embodiment, the phrase of the second message indicating existence of available information means that: a UE-MeasurementsAvailable field in the second message indicates the existence of available information.

In one embodiment, the phrase of the second message indicating existence of available information means that: a rlf-InfoAvailable field in a UE-MeasurementsAvailable field in the second message indicates the existence of available information.

In one embodiment, the phrase of the second message indicating existence of available information means that: there exists available information related to the invalidation of the first bearer.

In one embodiment, the phrase of the second message indicating existence of available information means that: there exists available information related to the invalidation of the first-type bearer.

In one embodiment, the phrase of the second message indicating existence of available information means that: there exists available information related to the invalidation of the second-type bearer.

In one embodiment, the phrase of the second message indicating existence of available information means that: information related to the invalidation of the first bearer that is stored in the first state variable is the available information.

In one embodiment, the phrase of the second message indicating existence of available information means that: information related to the invalidation of the first-type bearer that is stored in the first state variable is the available information.

In one embodiment, an RLC entity associated with the first bearer refers to that: the first bearer is an RLC bearer, and an RLC entity associated with the first bearer is an RLC entity corresponding to the RLC bearer.

In one embodiment, an RLC entity associated with the first bearer refers to that: the first bearer is a sidelink RLC bearer, and an RLC entity associated with the first bearer is an RLC entity of a PC5 interface corresponding to the sidelink RLC bearer.

In one embodiment, an RLC entity associated with the first bearer refers to that: the first bearer is a radio bearer, and an RLC entity associated with the first bearer is an RLC entity corresponding to an RLC bearer used for bearing the first bearer.

In one embodiment, an RLC entity associated with the first bearer refers to that: the first bearer is a radio bearer, and an RLC entity associated with the first bearer is an RLC entity of a PC5 interface corresponding to a sidelink RLC bearer used for bearing the first bearer.

In one embodiment, an RLC entity associated with the first bearer refers to that: the first bearer is a physical channel, and an RLC entity associated with the first bearer is an RLC entity generating an RLC PDU borne by the first bearer.

In one embodiment, an RLC entity associated with the first bearer refers to that: the first bearer is a transport channel, and an RLC entity associated with the first bearer is an RLC entity generating an RLC PDU borne by the first bearer.

In one embodiment, an RLC entity associated with the first bearer refers to that: the first bearer is a logical channel, and an RLC entity associated with the first bearer is an RLC entity corresponding to the first bearer.

In one embodiment, an RLC entity associated with the first bearer refers to that: the first bearer is a sidelink physical channel, and an RLC entity associated with the first bearer is an RLC entity generating an RLC PDU borne by the first bearer.

In one embodiment, an RLC entity associated with the first bearer refers to that: the first bearer is a sidelink transport channel, and an RLC entity associated with the first bearer is an RLC entity generating an RLC PDU borne by the first bearer.

In one embodiment, an RLC entity associated with the first bearer refers to that: the first bearer is a sidelink logical channel, and an RLC entity associated with the first bearer is an RLC entity corresponding to the first bearer.

In one embodiment, an RLC entity associated with the first bearer refers to that: the first bearer is a radio link for the first cell group, and an RLC entity associated with the first bearer is an RLC entity generating an RLC PDU borne by the first bearer.

In one embodiment, an RLC entity associated with the first bearer refers to that: the first bearer is a sidelink radio link for a L2 U2N relay UE, the L2 U2N relay UE being a L2 U2N relay UE between the first node and the first cell group, and an RLC entity associated with the first bearer is an RLC entity generating an RLC PDU for bearing a PDCP PDU for the first cell group that is transmitted by the first bearer.

In one embodiment, an RLC entity associated with the first bearer includes an RLC entity of a Uu interface.

In one embodiment, an RLC entity associated with the first bearer includes an RLC entity of a PC5 interface.

In one embodiment, an RLC entity associated with the first bearer is an RLC entity having a mapping relation with the first bearer.

In one embodiment, an RLC entity associated with the first bearer is an RLC entity that encapsulates data on the first bearer.

In one embodiment, an RLC entity associated with the first bearer is an RLC entity that generates data borne by the first bearer.

In one embodiment, the first state variable is a state variable of the first node.

In one embodiment, the name of the first state variable includes "var".

In one embodiment, the name of the first state variable includes "report".

In one embodiment, the name of the first state variable includes "relay".

In one embodiment, the name of the first state variable includes "path".

In one embodiment, the name of the first state variable includes "relay".

In one embodiment, the first state variable is a VarRLF-Report.

In one embodiment, the first information is transmitted via an RRC message.

In one embodiment, the first information is transmitted via a MAC CE.

In one embodiment, when the first bearer is the first-type bearer, the first information is transmitted via a MAC CE; when the first bearer is the second-type bearer, the first information is transmitted via an RRC message.

In one embodiment, the action of storing information for the invalidation of the first bearer in the first state variable comprises: storing an identity of the first cell group.

In one embodiment, the action of storing information for the invalidation of the first bearer in the first state variable comprises: storing an identity of a PCell of the first cell group.

In one embodiment, the action of storing information for the invalidation of the first bearer in the first state variable comprises: storing a cause of the invalidation of the first bearer.

In one embodiment, the action of storing information for the invalidation of the first bearer in the first state variable comprises: storing a type of the invalidation of the first bearer.

In one embodiment, the action of storing information for the invalidation of the first bearer in the first state variable comprises: storing whether a second-type bearer is used.

In one embodiment, the action of storing information for the invalidation of the first bearer in the first state variable comprises: storing a measurement result.

In one embodiment, the action of storing information for the invalidation of the first bearer in the first state variable comprises: storing a measurement result of a configured measurement object.

In one embodiment, the action of storing information for the invalidation of the first bearer in the first state variable comprises: storing an identity of a L2 U2N relay UE being used.

In one embodiment, the first node transmits the first information on a second bearer; the second bearer being associated with the first cell group; one of the first bearer and the second bearer is the first-type bearer while the other is the second-type bearer;

herein, an RLC entity associated with the first-type bearer is an RLC entity of a Uu interface; an RLC entity associated with the second-type bearer is an RLC entity of a PC5 interface; the first-type bearer uses a primary link; the second-type bearer uses a sidelink.

In one embodiment, the phrase of the second bearer being associated with a first cell group means that: the second bearer is a bearer between the first node and the first cell group.

In one embodiment, the phrase of the second bearer being associated with a first cell group means that: the second bearer is terminated at the first node and the first cell group.

In one embodiment, the phrase of the second bearer being associated with a first cell group means that: the second bearer is terminated at the first node and a base station of the first cell group.

In one embodiment, the phrase of the second bearer being associated with a first cell group means that: PDCP entities corresponding to the second bearer are respectively in the first node and the first cell group.

In one embodiment, the phrase of the second bearer being associated with a first cell group means that: RLC entities corresponding to the second bearer are respectively in the first node and the first cell group.

In one embodiment, the phrase of the second bearer being associated with a first cell group means that: MAC corresponding to or used by or mapped to the second bearer is for the first cell group.

In one embodiment, the phrase of the second bearer being associated with a first cell group means that: the second bearer is used for transmitting a PDCP PDU between the first node and the first cell group.

In one embodiment, the phrase of the second bearer being associated with a first cell group means that: the second bearer is used for transmitting a PDCP SDU between the first node and the first cell group.

In one embodiment, the phrase of the second bearer being associated with a first cell group means that: the second bearer is used for transmitting an RLC PDU between the first node and the first cell group.

In one embodiment, the phrase of the second bearer being associated with a first cell group means that: the second bearer is used for transmitting a MAC PDU between the first node and the first cell group.

In one embodiment, the phrase of the second bearer being associated with a first cell group means that: the second bearer is used for transmitting data for the first cell group.

In one embodiment, the phrase of the second bearer being associated with a first cell group means that: at least SRB1 between the first node and the first cell group uses the second bearer.

In one embodiment, the phrase of the second bearer being associated with a first cell group means that: there is a mapping relation between at least an SRB1 between the first node and the first cell group and the second bearer.

In one embodiment, the phrase of the second bearer being associated with a first cell group means that: the second bearer is a bearer between the first node and a L2 U2N relay UE, the L2 U2N relay UE being a relay between the first node and the first cell group.

In one embodiment, the phrase of the second bearer being associated with a first cell group means that: the second bearer is a bearer between the first node and a L2 U2N relay UE, the L2 U2N relay UE forwarding data between the first node and the first cell group.

In one embodiment, the phrase of the second bearer being associated with a first cell group means that: the second bearer is an RLC bearer between the first node and a L2 U2N relay UE, the L2 U2N relay UE being a relay between the first node and the first cell group.

In one embodiment, the phrase of the second bearer being associated with a first cell group means that: the second bearer is an RLC bearer between the first node and a L2 U2N relay UE, the L2 U2N relay UE forwarding data between the first node and the first cell group.

In one embodiment, the phrase of the second bearer being associated with a first cell group means that: the second bearer is a sidelink radio link between the first node and a L2 U2N relay UE, the L2 U2N relay UE being a relay between the first node and the first cell group.

In one embodiment, the phrase of the second bearer being associated with a first cell group means that: the second bearer is a sidelink radio link between the first node and a L2 U2N relay UE, the L2 U2N relay UE forwarding data between the first node and the first cell group.

In one embodiment, the phrase of the second bearer being associated with a first cell group means that: the second bearer is an RLC bearer between the first node and a L2 U2N relay UE, the second bearer used for bearing at least the SRB1, the at least SRB1 being an SRB between the first node and the first cell group.

In one embodiment, an RLC entity associated with the first-type bearer refers to that: the first-type bearer is an RLC bearer, and an RLC entity associated with the first-type bearer is an RLC entity corresponding to the RLC bearer.

In one embodiment, an RLC entity associated with the first-type bearer refers to that: the first-type bearer is a sidelink RLC bearer, and an RLC entity associated with the first-type bearer is an RLC entity of a PC5 interface corresponding to the sidelink RLC bearer.

In one embodiment, an RLC entity associated with the first-type bearer refers to that: the first-type bearer is a radio bearer, and an RLC entity associated with the first-type bearer is an RLC entity corresponding to an RLC bearer used for bearing the first-type bearer.

In one embodiment, an RLC entity associated with the first-type bearer refers to that: the first-type bearer is a radio bearer, and an RLC entity associated with the first-type bearer is an RLC entity of a PC5 interface corresponding to a sidelink RLC bearer used for bearing the first-type bearer.

In one embodiment, an RLC entity associated with the first-type bearer refers to that: the first-type bearer is a physical channel, and an RLC entity associated with the first-type bearer is an RLC entity generating an RLC PDU borne by the first-type bearer.

In one embodiment, an RLC entity associated with the first-type bearer refers to that: the first-type bearer is a transport channel, and an RLC entity associated with the first-type bearer is an RLC entity generating an RLC PDU borne by the first-type bearer.

In one embodiment, an RLC entity associated with the first-type bearer refers to that: the first-type bearer is a logical channel, and an RLC entity associated with the first-type bearer is an RLC entity corresponding to the first-type bearer.

In one embodiment, an RLC entity associated with the first-type bearer refers to that: the first-type bearer is a sidelink physical channel, and an RLC entity associated with the first-type bearer is an RLC entity generating an RLC PDU borne by the first-type bearer.

In one embodiment, an RLC entity associated with the first-type bearer refers to that: the first-type bearer is a sidelink transport channel, and an RLC entity associated with the first-type bearer is an RLC entity generating an RLC PDU borne by the first-type bearer.

In one embodiment, an RLC entity associated with the first-type bearer refers to that: the first-type bearer is a sidelink logical channel, and an RLC entity associated with the first-type bearer is an RLC entity corresponding to the first-type bearer.

In one embodiment, an RLC entity associated with the first-type bearer refers to that: the first-type bearer is a radio link for the first cell group, and an RLC entity associated with the first-type bearer is an RLC entity generating an RLC PDU borne by the first-type bearer.

In one embodiment, an RLC entity associated with the first-type bearer refers to that: the first-type bearer is a sidelink radio link for a L2 U2N relay UE, the L2 U2N relay UE being a L2 U2N relay UE between the first node and the first cell group, and an RLC entity associated with the first-type bearer is an RLC entity generating an RLC PDU for bearing a PDCP PDU for the first cell group that is transmitted by the first-type bearer.

In one embodiment, an RLC entity associated with the first-type bearer is an RLC entity having a mapping relation with the first-type bearer.

In one embodiment, an RLC entity associated with the first-type bearer is an RLC entity that encapsulates data on the first-type bearer.

In one embodiment, an RLC entity associated with the first-type bearer is an RLC entity that generates data borne by the first-type bearer.

In one embodiment, an RLC entity associated with the second-type bearer refers to that: the second-type bearer is an RLC bearer, and an RLC entity associated with the second-type bearer is an RLC entity corresponding to the RLC bearer.

In one embodiment, an RLC entity associated with the second-type bearer refers to that: the second-type bearer is a sidelink RLC bearer, and an RLC entity associated with the second-type bearer is an RLC entity of a PC5 interface corresponding to the sidelink RLC bearer.

In one embodiment, an RLC entity associated with the second-type bearer refers to that: the second-type bearer is a radio bearer, and an RLC entity associated with the second-type bearer is an RLC entity corresponding to an RLC bearer used for bearing the second-type bearer.

In one embodiment, an RLC entity associated with the second-type bearer refers to that: the second-type bearer is a radio bearer, and an RLC entity associated with the second-type bearer is an RLC entity of a PC5 interface corresponding to a sidelink RLC bearer used for bearing the second-type bearer.

In one embodiment, an RLC entity associated with the second-type bearer refers to that: the second-type bearer is a physical channel, and an RLC entity associated with the second-type bearer is an RLC entity generating an RLC PDU borne by the second-type bearer.

In one embodiment, an RLC entity associated with the second-type bearer refers to that: the second-type bearer is a transport channel, and an RLC entity associated with the second-type bearer is an RLC entity generating an RLC PDU borne by the second-type bearer.

In one embodiment, an RLC entity associated with the second-type bearer refers to that: the second-type bearer is a logical channel, and an RLC entity associated with the second-type bearer is an RLC entity corresponding to the second-type bearer.

In one embodiment, an RLC entity associated with the second-type bearer refers to that: the second-type bearer is a sidelink physical channel, and an RLC entity associated with the second-type bearer is an RLC entity generating an RLC PDU borne by the second-type bearer.

In one embodiment, an RLC entity associated with the second-type bearer refers to that: the second-type bearer is a sidelink transport channel, and an RLC entity associated with the second-type bearer is an RLC entity generating an RLC PDU borne by the second-type bearer.

In one embodiment, an RLC entity associated with the second-type bearer refers to that: the second-type bearer is a sidelink logical channel, and an RLC entity associated with the second-type bearer is an RLC entity corresponding to the second-type bearer.

In one embodiment, an RLC entity associated with the second-type bearer refers to that: the second-type bearer is a radio link for the first cell group, and an RLC entity associated with the second-type bearer is an RLC entity generating an RLC PDU borne by the second-type bearer.

In one embodiment, an RLC entity associated with the second-type bearer refers to that: the second-type bearer is a sidelink radio link for a L2 U2N relay UE, the L2 U2N relay UE being a L2 U2N relay UE between the first node and the first cell group, and an RLC entity associated with the second-type bearer is an RLC entity generating an RLC PDU for bearing a PDCP PDU for the first cell group that is transmitted by the second-type bearer.

In one embodiment, an RLC entity associated with the second-type bearer is an RLC entity having a mapping relation with the second-type bearer.

In one embodiment, an RLC entity associated with the second-type bearer is an RLC entity that encapsulates data on the second-type bearer.

In one embodiment, an RLC entity associated with the second-type bearer is an RLC entity that generates data borne by the second-type bearer.

In one embodiment, an RRC message comprising the first information is transmitted using the second bearer.

In one embodiment, the first bearer and the second bearer are different.

In one embodiment, the first-type bearer and the second-type bearer are different.

In one embodiment, a counterpart RLC entity of an RLC entity of the Uu interface is located in the first cell group or a base station corresponding to the first cell.

In one embodiment, a counterpart RLC entity of an RLC entity of the PC5 interface is located in a L2 U2N relay UE of the first node.

In one embodiment, an RLC entity of the PC5 interface is for sidelink communications.

In one embodiment, an RLC entity of the Uu interface is for non-sidelink communications or primary link communications.

In one embodiment, the phrase that the first-type bearer uses a primary link means that: the first-type bearer is a primary link.

In one embodiment, the phrase that the first-type bearer uses a primary link means that: the first-type bearer is a primary link radio link.

In one embodiment, the phrase that the first-type bearer uses a primary link means that: the first-type bearer is a direct path.

In one embodiment, the phrase that the first-type bearer uses a primary link means that: the first-type bearer is a bearer between the first node and the first cell group and without being through any relay.

In one embodiment, the phrase that the first-type bearer uses a primary link means that: the first-type bearer corresponds to a Uu interface.

In one embodiment, the phrase that the first-type bearer uses a primary link means that: a physical channel corresponding to or associated with the first-type bearer is a physical channel of a Uu interface.

In one embodiment, the phrase that the first-type bearer uses a primary link means that: physical channels corresponding to or associated with or used by the first-type bearer include a physical uplink control channel (PUCCH) and a physical downlink control channel (PDCCH).

In one embodiment, the phrase that the first-type bearer uses a primary link means that: the first-type bearer is an RLC bearer, and an RLC entity corresponding to the RLC bearer is located in the first node and the first cell group.

In one embodiment, the phrase that the first-type bearer uses a primary link means that: a protocol entity corresponding to the first-type bearer is located in the first node and the first cell group.

In one embodiment, the phrase that the first-type bearer uses a primary link means that: the first-type bearer is a channel, and the first bearer is a channel between the first node and the first cell group.

In one embodiment, the phrase that the first-type bearer uses a primary link means that: a channel corresponding to the first-type bearer is a channel between the first node and the first cell group.

In one embodiment, the phrase that the second-type bearer uses a sidelink means that: the second-type bearer is a sidelink.

In one embodiment, the phrase that the second-type bearer uses a sidelink means that: the second-type bearer is a sidelink radio link.

In one embodiment, the phrase that the second-type bearer uses a sidelink means that: the second-type bearer is an indirect path.

In one embodiment, the phrase that the second-type bearer uses a sidelink means that: the second-type bearer is a bearer between the first node and the first cell group and being through a L2 U2N relay UE.

In one embodiment, the phrase that the second-type bearer uses a sidelink means that: the second-type bearer corresponds to a PC5 interface.

In one embodiment, the phrase that the second-type bearer uses a sidelink means that: a physical channel corresponding to or associated with the second-type bearer is a physical channel of a PC5 interface.

In one embodiment, the phrase that the second-type bearer uses a sidelink means that: physical channels corresponding to or associated with or used by the second-type bearer include a physical sidelink shared channel (PSSCH) and a physical sidelink control channel (PSCCH).

In one embodiment, the phrase that the second-type bearer uses a sidelink means that: the second-type bearer is a sidelink RLC bearer, and an RLC entity corresponding to the RLC bearer is located in the first node and the L2 U2N relay UE.

In one embodiment, the phrase that the second-type bearer uses a sidelink means that: a protocol entity corresponding to the second-type bearer is located in the first node and the L2 U2N relay UE.

In one embodiment, the phrase that the second-type bearer uses a sidelink means that: the second-type bearer is a channel, and the first bearer is a channel between the first node and the L2 U2N relay UE.

In one embodiment, the phrase that the second-type bearer uses a sidelink means that: a channel corresponding to the second-type bearer is a channel between the first node and the L2 U2N relay UE.

In one embodiment, the first node is only configured with a cell group.

In one embodiment, the first node is only configured with a Master Cell Group (MCG) rather than a Secondary Cell Group (SCG).

In one embodiment, an SRB1 of the first node is simultaneously associated with the first bearer and the second bearer.

In one embodiment, the phrase that an SRB1 of the first node is simultaneously associated with the first bearer and the second bearer means that: the SRB1 of the first node has a mapping relation with both the first bearer and the second bearer.

In one embodiment, the phrase that an SRB1 of the first node is simultaneously associated with the first bearer and the second bearer means that: data of the SRB1 is transmitted using either of the first bearer and the second bearer.

In one embodiment, the phrase that an SRB1 of the first node is simultaneously associated with the first bearer and the second bearer means that: data of the SRB1 is transmitted using both of the first bearer and the second bearer simultaneously.

In one embodiment, the phrase that an SRB1 of the first node is simultaneously associated with the first bearer and the second bearer means that: the first bearer is an RLC bearer, while the second bearer is a sidelink RLC bearer, where the first bearer is used for bearing data of the first bearer; the second bearer is also used for bearing data of the first bearer.

In one embodiment, the phrase that an SRB1 of the first node is simultaneously associated with the first bearer and the second bearer means that: the first bearer is an RLC bearer, while the second bearer is a sidelink RLC bearer, where RB(s) borne by the first bearer includes/include the SRB1; RB(s) borne by the second bearer includes/include the SRB1.

In one embodiment, the first-type bearer is an RLC bearer, while the second-type bearer is a sidelink RLC bearer.

In one embodiment, the first operation set comprises reconfiguring medium access control (MAC) associated with the first bearer.

In one embodiment, a MAC associated with the first bearer is: a MAC having a mapping relation with the first bearer.

In one embodiment, a MAC associated with the first bearer is: a MAC bearing data of the first bearer.

In one embodiment, a MAC associated with the first bearer is: a MAC bearing a PDU of the first bearer.

In one embodiment, a MAC associated with the first bearer is: the first bearer is a physical channel, where the MAC generating a MAC PDU borne by the first bearer is the MAC associated with the first bearer.

In one embodiment, a MAC associated with the first bearer is: a MAC generating a MAC PDU that occupies the first bearer is the MAC associated with the first bearer.

In one embodiment, a MAC associated with the first bearer is: a MAC of a primary link or Uu interface.

In one embodiment, a MAC associated with the second bearer is: a MAC of a sidelink or PC5 interface.

In one embodiment, the action of reconfiguring a MAC associated with the first bearer means to reset the MAC associated with the first bearer.

In one embodiment, the first bearer is only associated with one MAC.

In one embodiment, a MAC associated with the first bearer and a MAC associated with the second bearer are different.

In one embodiment, a MAC associated with the first-type bearer and a MAC associated with the second-type bearer are different.

In one embodiment, a MAC associated with the first-type bearer and a MAC associated with the second-type bearer are the same.

In one embodiment, the first bearer is the first-type bearer; the action of storing information for the invalidation of the first bearer in the first state variable comprises storing a cause of the invalidation of the first bearer and whether a second-type bearer is used; a cause of invalidation of the first bearer belongs to a first candidate cause set, the first candidate cause set comprising radio link failure, cell handover failure and path switch failure.

In one subembodiment, the second-type bearer is a sidelink-related bearer.

In one subembodiment, the second-type bearer is a sidelink radio link.

In one subembodiment, at least one of the cell handover failure or the path switch failure comprised in the first candidate cause set belongs to a failure of reconfiguration with sync.

In one subembodiment, both of the cell handover failure and the path switch failure comprised in the first candidate cause set belong to a failure of reconfiguration with sync.

In one embodiment, the action of detecting invalidation of a first bearer comprises: detecting expiration of a timer T310.

In one embodiment, the action of detecting invalidation of a first bearer comprises: detecting expiration of a timer T310 associated with the first bearer.

In one embodiment, the action of detecting invalidation of a first bearer comprises: detecting expiration of a timer T312.

In one embodiment, the action of detecting invalidation of a first bearer comprises: detecting expiration of a timer T312 associated with the first bearer.

In one embodiment, the action of detecting invalidation of a first bearer comprises: detecting expiration of a timer T304.

In one embodiment, the action of detecting invalidation of a first bearer comprises: detecting expiration of a timer T304 associated with the first bearer.

In one embodiment, the action of detecting invalidation of a first bearer comprises: detecting expiration of a first timer, the first timer being used for path switch.

In one subembodiment, as a response to receiving a Reconfiguration with SYNC used for path switch, the first timer is started.

In one embodiment, the action of detecting invalidation of a first bearer comprises: detecting expiration of a first timer associated with the first bearer, the first timer being used for path switch.

In one subembodiment, as a response to receiving a Reconfiguration with SYNC used for path switch, the first timer is started.

In one embodiment, the action of detecting invalidation of a first bearer comprises: detecting a radio link failure, the first bearer being the first-type bearer.

In one embodiment, the action of detecting invalidation of a first bearer comprises: detecting a sidelink radio link failure, the first bearer being the second-type bearer.

In one embodiment, the action of detecting invalidation of a first bearer comprises: detecting incompatibility of sidelink RRC configuration, the first bearer being the second-type bearer.

In one embodiment, the action of detecting invalidation of a first bearer comprises: detecting expiration of a timer T400, the first bearer being the second-type bearer.

In one embodiment, the action of detecting invalidation of a first bearer comprises: receiving from a MAC an indication of reaching a maximum number of Hybrid Automatic Repeat Request (HARQ) discontinuous transmissions (DTX), the first bearer being the second-type bearer.

In one embodiment, the action of detecting invalidation of a first bearer comprises: detecting an indication from a higher layer, which indicates that the first bearer is released or unavailable or invalid.

In one embodiment, the action of detecting invalidation of a first bearer comprises: detecting a failure in terms of security.

In one embodiment, the action of detecting invalidation of a first bearer comprises: receiving a first notification, the first notification being used to determine invalidation of the first bearer, the first bearer being the second-type bearer.

In one subembodiment, a transmitter of the first notification is a L2 U2N relay UE of the first node.

In one subembodiment, the first notification is transmitted on sidelink.

In one subembodiment, the first notification is a NotificationMessageSidelink.

In one subembodiment, the first notification indicates that a radio link failure occurs in a L2 U2N relay UE of the first node.

In one subembodiment, the first notification indicates that a L2 U2N relay UE of the first node receives a RRCreconfiguration message comprising a ReconfigurationWithSync.

In one subembodiment, the first notification indicates that a L2 U2N relay UE of the first node receives a RRCreconfiguration message comprising a ReconfigurationWithSync relevant to MCG.

In one subembodiment, the first notification indicates that a cell reselection occurs in a L2 U2N relay UE of the first node.

In one embodiment, the action of detecting invalidation of a first bearer comprises: receiving from a MAC an indication of something wrong with random access, the first bearer being the first-type bearer.

In one embodiment, the action of detecting invalidation of a first bearer comprises: receiving from an RLC entity an indication that a maximum retransmission number is reached, the first bearer being the first-type bearer.

In one subembodiment, the RLC entity indicating that a maximum retransmission number is reached is associated with the first bearer or is an RLC entity corresponding to the first bearer.

In one embodiment, the action of detecting invalidation of a first bearer comprises: receiving from a MAC an indication of constant Listen Before Talk (LBT) failures, the first bearer being the first-type bearer.

In one embodiment, the first node is not configured with an SRB3.

In one embodiment, the SRB1 of the first node is an SRB between the first node and the first cell group.

In one embodiment, when the first bearer is a second-type bearer, the first operation set does not comprise re-establishing an RLC entity associated with the first bearer.

In one embodiment, when the first bearer is a second-type bearer, the first operation set does not comprise storing information for the invalidation of the first bearer in the first state variable.

In one embodiment, the sentence that "the first operation set does not comprise storing information for the invalidation of the first bearer in the first state variable" means: not storing information for the invalidation of the first bearer.

In one embodiment, the sentence that "the first operation set does not comprise storing information for the invalidation of the first bearer in the first state variable" means: storing information for the invalidation of the first bearer in a variable other than the first state variable.

In one embodiment, the first condition set comprises that the first bearer is invalid.

In one embodiment, the first condition set comprises that the second bearer is invalid.

In one embodiment, the first condition set comprises that both of the first bearer and the second bearer are invalid.

In one embodiment, the first condition set comprises that the first bearer is invalid, and before resuming the first bearer the second bearer is detected to be invalid.

In one embodiment, the first condition set comprises that the second bearer is detected to be invalid, and meanwhile there is no bearer or radio link that is still valid for the first cell group.

In one embodiment, before the first bearer is detected to be invalid, the second bearer is not detected to be invalid.

In one embodiment, the first condition set does not comprise initiating an RRC re-establishment.

In one embodiment, the first condition set does not comprise discarding stored RRC message segment.

In one embodiment, the action of detecting the invalidation of the first bearer will not trigger performing of RRC re-establishment.

In one subembodiment, the first bearer is the first-type bearer.

In one subembodiment, the first node is simultaneously configured with the first-type bearer and the second-type bearer, and any bearer of the first-type bearer and the second-type bearer being configured other than the first bearer is not detected to be invalid.

In one embodiment, the action of re-establishing an RLC entity associated with the first bearer comprises: discarding all of RLC SDUs, RLC SDU segments and RLC PDUs.

In one embodiment, the action of re-establishing an RLC entity associated with the first bearer comprises: stopping and resetting timers of all RLC entities associated with the first bearer.

In one embodiment, the action of re-establishing an RLC entity associated with the first bearer comprises: resetting all state variables of an RLC entity associated with the first bearer to be initial values.

Embodiment 2

Figure 2:
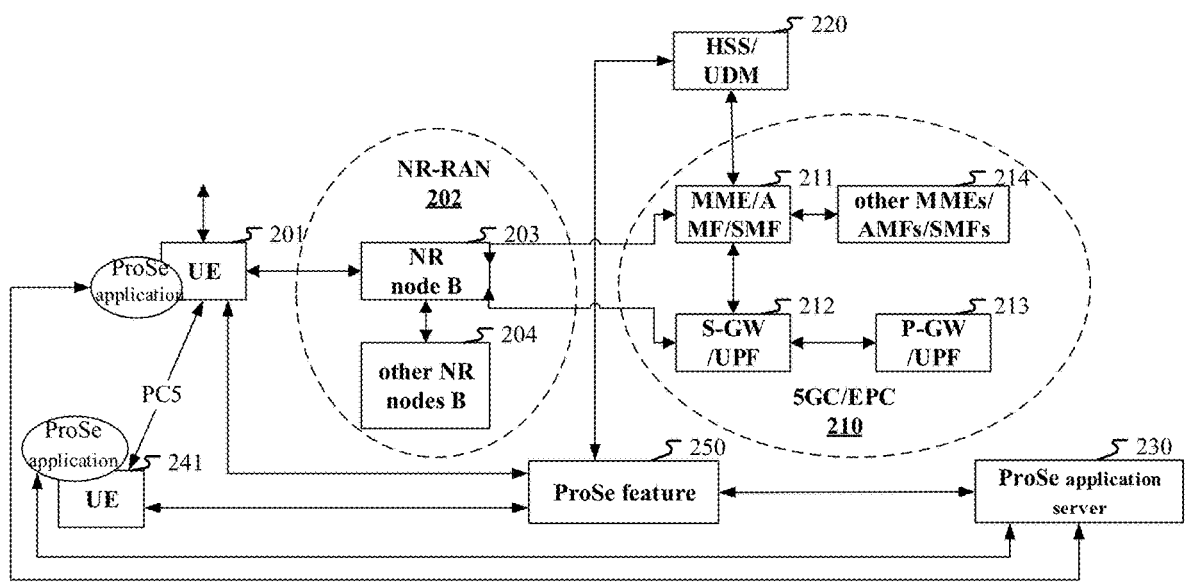
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an SUNG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application is the UE 201.

In one embodiment, a base station of the first node in the present application is the gNB 203.

In one embodiment, a radio link from the UE 201 to the NR Node B is an uplink.

In one embodiment, a radio link from the NR Node B to the UE 201 is a downlink.

In one embodiment, the UE 201 supports relay transmission.

In one embodiment, the UE 201 includes cellphone.

In one embodiment, the UE 201 is a means of transportation including automobile.

In one embodiment, the UE 201 supports multiple SIMs.

In one embodiment, the UE 201 supports sidelink transmission.

In one embodiment, the UE 201 supports MBS transmission.

In one embodiment, the UE 201 supports MBMS transmission.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
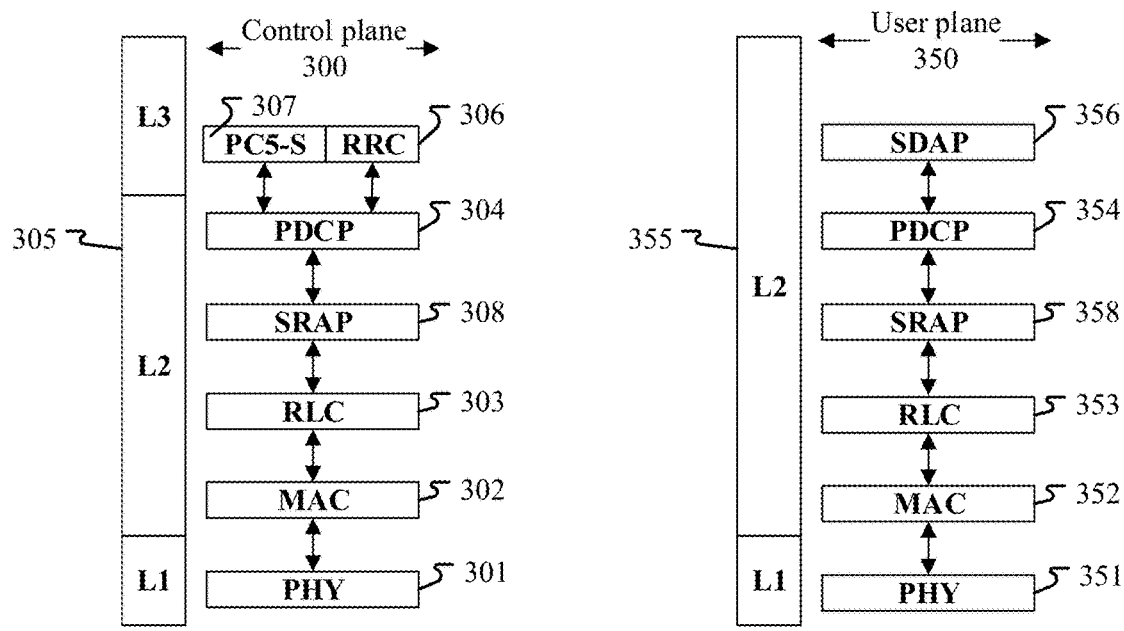
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involving relay services, its control plane can also comprise an Adaptation sublayer Sidelink Relay Adaptation Protocol (SRAP) 308, and its user plane can also comprise an Adaptation sublayer SRAP358. The introduction of the Adaptation layer is beneficial to lower layers, for instance, a MAC layer, or an RLC layer, to multiplex and/or distinguish data from multiple source UEs.

In one embodiment, the radio protocol architecture in FIG. 3 is applicable to the first node in the present application.

In one embodiment, the radio protocol architecture in FIG. 3 is applicable to the second node in the present application.

In one embodiment, the first information in the present application is generated by the RRC306 or the MAC302.

In one embodiment, the first signaling in the present application is generated by the RRC 306.

In one embodiment, the second message in the present application is generated by the RRC306.

In one embodiment, the third message in the present application is generated by the RRC306.

Embodiment 4

Figure 4:
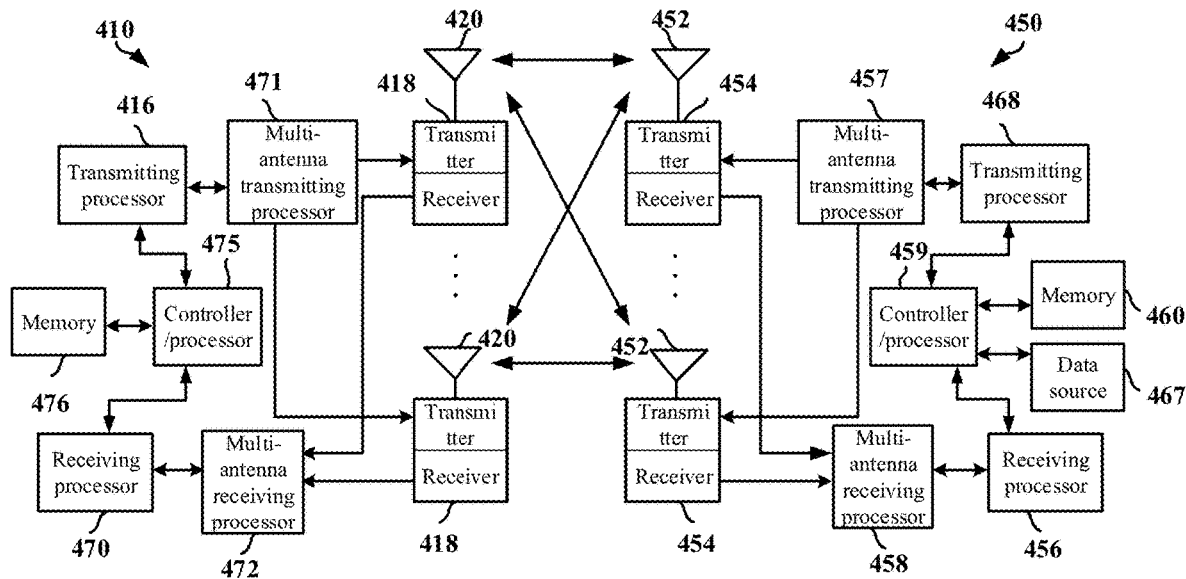
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, and optionally a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, and optionally a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: detects invalidation of a first bearer; the first bearer being associated with a first cell group; and as a response to the action of detecting invalidation of a first bearer, executes a first operation set, the first operation set being related to a type of the first bearer; and transmits first information as a response to the action of detecting invalidation of a first bearer; the first information being used to indicate the invalidation of the first bearer; and transmits a second message as a response to all conditions in a first condition set being satisfied; the second message indicating existence of available information; herein, the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, the first communication node 450 comprises a memory that stores a computer readable instruction program, the computer readable instruction program generates actions when executed by at least one processor, which include: detecting invalidation of a first bearer; the first bearer being associated with a first cell group; and as a response to the action of detecting invalidation of a first bearer, executing a first operation set, the first operation set being related to a type of the first bearer; and transmitting first information as a response to the action of detecting invalidation of a first bearer; the first information being used to indicate the invalidation of the first bearer; and transmitting a second message as a response to all conditions in a first condition set being satisfied; the second message indicating existence of available information; herein, the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a vehicle-mounted terminal.

In one embodiment, the second communication device 410 is a relay.

In one embodiment, the second communication device 410 is a satellite.

In one embodiment, the second communication device 410 is an aircraft.

In one embodiment, the receiver 454 (comprising the antenna 452), the receiving processor 456 and the controller/processor 459 are used for receiving the first signaling in the present application.

In one embodiment, the transmitter 454 (comprising the antenna 452), the transmitting processor 468 and the controller/processor 459 are used for transmitting the first information in the present application.

In one embodiment, the transmitter 454 (comprising the antenna 452), the transmitting processor 468 and the controller/processor 459 are used for transmitting the second message in the present application.

In one embodiment, the transmitter 454 (comprising the antenna 452), the transmitting processor 468 and the controller/processor 459 are used for transmitting the third message in the present application.

Embodiment 5

Figure 5:
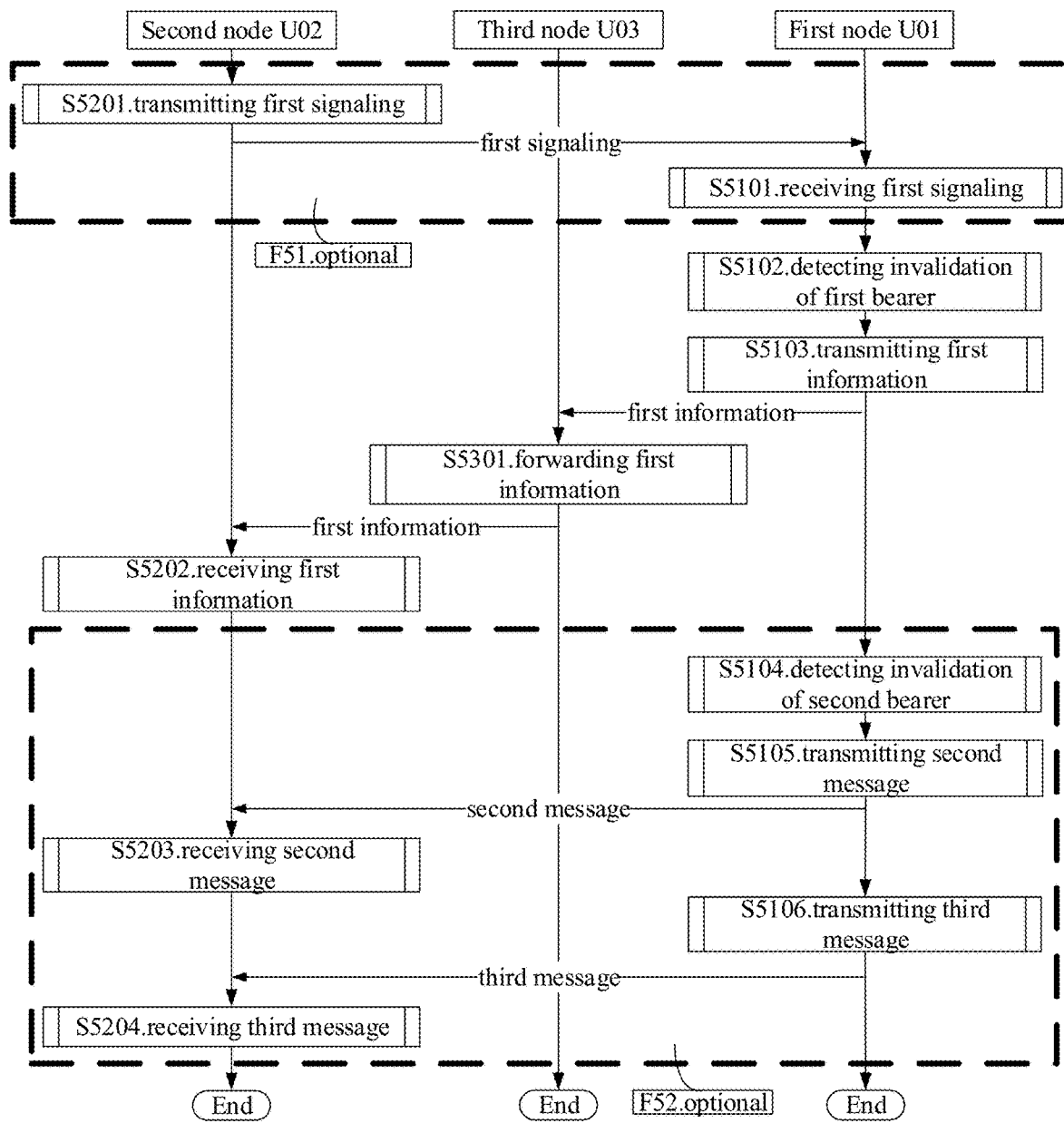
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to the first node in the present application. It should be particularly noted that the sequence illustrated herein does not set any limit on the orders in which signals are transmitted and implementations in this present application. Herein, steps in F51 and F52 are optional.

The first node U01 receives a first signaling in step S5101; detects invalidation of a first bearer in step S5102; transmits first information in step S5103; detects invalidation of a second bearer in step S5104; transmits a second message in step S5105; and transmits a third message in step S5106.

The second node U02 transmits a first signaling in step S5201; and receives first information in step S5202; receives a second message in step S5203; and receives a third message in step S5204.

The third node U03 forwards first information in step S5301.

In Embodiment 5, the first bearer being associated with a first cell group; the first node U01, as a response to the action of detecting invalidation of a first bearer, executes a first operation set, the first operation set being related to a type of the first bearer; and the first node U01, as a response to the action of detecting invalidation of a first bearer, transmits first information, the first information being used to indicate the invalidation of the first bearer, and as a response to all conditions in a first condition set being satisfied, transmits a second message; the second message indicating existence of available information;

herein, the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, the first node U01 is a U2N relay UE.

In one embodiment, the first node U01 is a U2N remote UE.

In one embodiment, the first node U01 is an NR ProSe U2N remote UE.

In one embodiment, a third node U03 is a L2 U2N relay UE.

In one embodiment, a third node U03 is a neighbor cell of the first node U01.

In one embodiment, a third node U03 and the second node U02 belong to a same CU.

In one embodiment, a third node U03 and the second node U02 belong to a same DU.

In one embodiment, a third node U03 and the second node U02 belong to a same gNB.

In one embodiment, the third node U03 and the second node U02 are respectively cells with different physical cell identities (PCIs).

In one embodiment, a third node U03 and the second node U02 are respectively cells within the first cell group.

In one embodiment, a third node U03 is another TRP of the second node U02.

In one embodiment, a third node U03 is another beam of the second node U02, corresponding to another group of CSI-RS reference signals.

In one embodiment, the second node U02 is a base station.

In one embodiment, the second node U02 is a primary cell (PCell) of the first node U01.

In one embodiment, the second node U02 is a Master Cell Group (MCG) of the first node U01.

In one embodiment, the second node U02 corresponds to a first cell group in the present application or a base station corresponding to the first cell group.

In one embodiment, the first signaling is directly transmitted to the first node U01 by the second node U02 without being relayed.

In one embodiment, the first signaling is transmitted to the first node U01 by the second node U02 via forwarding of the third node U03.

In one embodiment, the first signaling is transmitted to the first node U01 by the second node U02 by means of both relay forwarding and directly transmitting.

In one embodiment, the first signaling is an RRC signaling.

In one embodiment, the first signaling comprises a SIB12.

In one embodiment, the first signaling comprises RRCReconfiguration.

In one embodiment, the first signaling comprises reconfigurationWithSync.

In one embodiment, the first signaling comprises cellgroupconfig.

In one embodiment, the first signaling comprises a masterCellGroup.

In one embodiment, the first signaling does not comprise a secondaryCellGroup.

In one embodiment, the first-type bearer is configured by radioBearerConfig comprised in the first signaling.

In one embodiment, the first-type bearer is configured by a masterCellGroup comprised in the first signaling.

In one embodiment, the first-type bearer is configured by a spCellGroup comprised in the first signaling.

In one embodiment, the second-type bearer is configured by SL-ConfigDedicatedNR comprised in the first signaling.

In one embodiment, the second-type bearer is configured by sl-L2RemoteConfig comprised in the first signaling.

In one embodiment, the first-type bearer is a bearer between the first node U01 and the second node U02 without being relayed.

In one embodiment, the second-type bearer is a bearer between the first node U01 and the second node U02 being relayed by the third node U03.

In one embodiment, the first-type bearer is an RLC bearer between the first node U01 and the second node U02.

In one embodiment, the first-type bearer is a radio link between the first node U01 and the second node U02.

In one embodiment, a protocol entity corresponding to the first-type bearer is located in the first node U01 and the second node U02.

In one embodiment, the second-type bearer is a sidelink RLC bearer between the first node U01 and the third node U03 used for transmitting data between the first node U01 and the second node U02.

In one embodiment, the second-type bearer is a sidelink radio link between the first node U01 and the third node U03.

In one embodiment, a protocol entity corresponding to the second-type bearer is located in the first node U01 and the third node U03.

In one embodiment, the first-type bearer and the second-type bearer are both used for processing data between the first node U01 and the second node U02.

In one embodiment, the first signaling is used for configuring the first bearer.

In one embodiment, the first signaling is used for configuring the second bearer, while the second signaling is associated with the first cell group.

In one subembodiment, the first bearer is the first-type bearer, while the second bearer is the second-type bearer.

In one subembodiment, the first bearer is the second-type bearer, while the second bearer is the first-type bearer.

In one embodiment, after the step S5102 of detecting invalidation of the first bearer and before the step S5103 of transmitting first information, the first node U01 configures a primary path of the PDCP entity of the SRB1 as for the second bearer;

herein, the first signaling indicates that an SRB1 is simultaneously associated with the first bearer and the second bearer, and that a primary path of the PDCP entity of the SRB1 is for the first bearer; the SRB1 is not configured with PDCP duplication; the first information comprises a first measurement result; the first information is used to indicate whether the first bearer is the second-type bearer.

In one subembodiment, the SRB1 of the first node U01 is an SRB between the first node U01 and the second node U02.

In one subembodiment, the sentence that the first signaling indicates that an SRB1 is simultaneously associated with the first bearer and the second bearer means: the first bearer and the second bearer are both associated with the SRB1.

In one subembodiment, the sentence that the first signaling indicates that an SRB1 is simultaneously associated with the first bearer and the second bearer means: the first bearer and the second bearer both have a mapping relation with the SRB1.

In one subembodiment, the sentence that the first signaling indicates that an SRB1 is simultaneously associated with the first bearer and the second bearer means: the first bearer and the second bearer are both used for transmitting data of the SRB1.

In one subembodiment, the sentence that the first signaling indicates that an SRB1 is simultaneously associated with the first bearer and the second bearer means: data of the SRB1 of the first node U01 can be transmitted in any of the first bearer or the second bearer.

In one subembodiment, the sentence that the first signaling indicates that an SRB1 is simultaneously associated with the first bearer and the second bearer means: data of the SRB1 of the first node U01 is repeatedly transmitted on the first bearer and the second bearer.

In one subembodiment, the SRB1 corresponds to and only corresponds to one PDCP entity, that is, a PDCP entity of the SRB1.

In one subembodiment, the sentence that the SRB1 is not configured with PDCP duplication means that the SRB1 of the first node U01 is not configured with pdcp-Duplication.

In one subembodiment, the sentence that the SRB1 is not configured with PDCP duplication means that a value of a pdcp-Duplication field configured for the SRB1 of the first node U01 is false.

In one subembodiment, the first measurement result comprised in the first information comprises a measurement result on a main link.

In one subembodiment, the first measurement result comprised in the first information comprises a measurement result on a sidelink radio link.

In one subembodiment, the first measurement result comprised in the first information comprises a measurement result on a measurement object configured for the first node U01.

In one subembodiment, the first measurement result comprised in the first information comprises an RSRP and/or an RSRQ for the second node U02.

In one subembodiment, the first measurement result comprised in the first information comprises an RSRP for the third node U03.

In one subembodiment, the first measurement result comprised in the first information comprises a measurement result on a neighbor cell.

In one subembodiment, the first measurement result comprised in the first information comprises a measurement result on a beam of the second node U02.

In one subembodiment, the first measurement result comprised in the first information comprises a measurement result on a candidate relay.

In one subembodiment, the first information explicitly indicates whether the first bearer is the second-type bearer.

In one subembodiment, the first information implicitly indicates whether the first bearer is the second-type bearer.

In one subembodiment, the PDCP entity of the SRB1 of the first node U01 has at most one Primarypath.

In one subembodiment, the sentence that the first signaling indicates that an SRB1 is simultaneously associated with the first bearer and the second bearer, and that a primary path of the PDCP entity of the SRB1 is for the first bearer means: an identity of a cell group of a primary path of the PDCP entity of the SRB1 of the first node U01 is an identity of the first cell that the first bearer corresponds to.

In one subembodiment, the sentence that the first signaling indicates that an SRB1 is simultaneously associated with the first bearer and the second bearer, and that a primary path of the PDCP entity of the SRB1 is for the first bearer means: an identity of a logical channel of a primary path of the PDCP entity of the SRB1 of the first node U01 is an identity of the first bearer.

In one subembodiment, the sentence that the first signaling indicates that an SRB1 is simultaneously associated with the first bearer and the second bearer, and that a primary path of the PDCP entity of the SRB1 is for the first bearer means: an identity of a logical channel of a primary path of the PDCP entity of the SRB1 of the first node U01 is an identity of a logical channel associated with or used by the first bearer.

In one subembodiment, the action of configuring a primary path of the PDCP entity of the SRB1 as for the second bearer means: an identity of a cell group of a primary path of the PDCP entity of the SRB1 of the first node U01 is configured as an identity of the first cell group associated with the second bearer.

In one subembodiment, the action of configuring a primary path of the PDCP entity of the SRB1 as for the second bearer means: an identity of a logical channel of a primary path of the PDCP entity of the SRB1 of the first node U01 is configured as an identity of the second bearer.

In one subembodiment, the action of configuring a primary path of the PDCP entity of the SRB1 as for the second bearer means: an identity of a logical channel of a primary path of the PDCP entity of the SRB1 of the first node U01 is configured as an identity of a sidelink logical channel associated with the second bearer.

In one subembodiment, the action of configuring a primary path of the PDCP entity of the SRB1 as for the second bearer means: an identity of a logical channel of a primary path of the PDCP entity of the SRB1 of the first node U01 is configured as an identity of a sidelink logical channel occupied by the second bearer.

In one subembodiment, the action of configuring a primary path of the PDCP entity of the SRB1 as for the second bearer means: an identity of a node of a primary path of the PDCP entity of the SRB1 of the first node U01 is configured as an identity of a relay associated with the second bearer.

In one subembodiment, the action of configuring a primary path of the PDCP entity of the SRB1 as for the second bearer means: an identity of a node of a primary path of the PDCP entity of the SRB1 of the first node U01 is configured as an identity of the third node U03.

In one embodiment, the first information is forwarded by the third node U03.

In one embodiment, the first information is transmitted using the second bearer.

In one subembodiment, the second bearer is the second-type bearer.

In one subembodiment, the first information is at least partial fields in an RRC message for the second node U02.

In one embodiment, the step S5102 of detecting invalidation of a first bearer comprises: detecting a radio link failure (RLF) occurring in the first bearer.

In one embodiment, the step S5102 of detecting invalidation of a first bearer comprises: detecting a radio link failure (RLF) occurring in a radio link between the first node U01 and the second node U02.

In one embodiment, the step S5102 of detecting invalidation of a first bearer comprises: detecting expiration of a timer T310.

In one embodiment, the step S5102 of detecting invalidation of a first bearer comprises: detecting expiration of a timer T312.

In one embodiment, the step S5102 of detecting invalidation of a first bearer comprises: detecting expiration of a timer T304.

In one embodiment, the step S5102 of detecting invalidation of a first bearer comprises: detecting an issue in a random access procedure for the second node U02.

In one embodiment, the step S5102 of detecting invalidation of a first bearer comprises: detecting an RLC maximum retransmission number being reached by the first bearer.

In one embodiment, the step S5102 of detecting invalidation of a first bearer comprises: detecting an occurrence of constant LBT failures.

In one embodiment, as a response to the step S5102 of detecting invalidation of the first bearer, the first node U01 executes the first operation set, where the first bearer is the first-type bearer.

In one subembodiment, the first operation comprises re-establishing an RLC entity associated with the first bearer but does not comprise storing information for the invalidation of the first bearer in the first state variable.

In one subembodiment, the first operation comprises storing information for the invalidation of the first bearer in the first state variable but does not comprise re-establishing an RLC entity associated with the first bearer.

In one subembodiment, the first operation comprises storing information for the invalidation of the first bearer in the first state variable as well as re-establishing an RLC entity associated with the first bearer.

In one embodiment, the step S5104 is performed after the step S5102.

In one embodiment, in step S5104, the action of detecting invalidation of the second bearer comprises: a radio link failure (RLF) occurring in the second bearer.

In one embodiment, in step S5104, the action of detecting invalidation of the second bearer comprises: a sidelink RLF occurring between the first node U01 and the third node U03.

In one embodiment, in step S5104, the action of detecting invalidation of the second bearer comprises: an RRC message compatibility failure occurring in the second bearer.

In one embodiment, in step S5104, the action of detecting invalidation of the second bearer comprises: a compatibility failure occurring in an RRC message on a PC5 interface between the first node U01 and the third node U03.

In one embodiment, in step S5104, the action of detecting invalidation of the second bearer comprises: the second bearer being released.

In one embodiment, in step S5104, the action of detecting invalidation of the second bearer comprises: a higher layer of the first node U01 indicating the invalidation of the second bearer.

In one embodiment, in step S5104, the action of detecting invalidation of the second bearer comprises: detecting expiration of a timer for the second bearer.

In one embodiment, in step S5104, the action of detecting invalidation of the second bearer comprises: detecting expiration of a timer T400 for the second bearer.

In one embodiment, in step S5104, the action of detecting invalidation of the second bearer comprises: detecting expiration of a timer T404 for the second bearer.

In one embodiment, in step S5104, the action of detecting invalidation of the second bearer comprises: detecting expiration of a timer for the second bearer, which is related to path switch.

In one embodiment, in step S5104, the action of detecting invalidation of the second bearer comprises: detecting a failure of a path switch for the second bearer.

In one embodiment, during the step S5104 of detecting invalidation of a second bearer, the first bearer is not yet resumed.

In one embodiment, during the step S5104 of detecting invalidation of a second bearer, there does not exist any bearer belonging to the first-type bearer and the second-type bearer other than the first bearer and the second bearer.

In one embodiment, the sentence of suspending an SRB1 along with the RRC re-establishment procedure, and performing either cell selection or relay selection means: the action of suspending the SRB1 belongs to the RRC re-establishment procedure.

In one embodiment, the sentence of suspending an SRB1 along with the RRC re-establishment procedure, and performing either cell selection or relay selection means: The SRB1 is inevitably suspended when an RRC re-establishment occurs.

In one embodiment, the sentence of suspending an SRB1 along with the RRC re-establishment procedure, and performing either cell selection or relay selection means: The action of performing either cell selection or relay selection belongs to the RRC re-establishment procedure.

In one embodiment, the sentence of suspending an SRB1 along with the RRC re-establishment procedure, and performing either cell selection or relay selection means: Either of cell selection and relay selection is inevitably performed when an RRC re-establishment occurs.

In one embodiment, the sentence of suspending an SRB1 along with the RRC re-establishment procedure, and performing either cell selection or relay selection means: either cell selection or relay selection is performed, or, both cell selection and relay selection are performed when an RRC re-establishment occurs.

In one embodiment, the RRC re-establishment procedure comprises initiating an RRC re-establishment request for the second node U02.

In one embodiment, the RRC re-establishment procedure comprises transmitting an RRC re-establishment request for a node other than the second node U02.

In one embodiment, the RRC re-establishment procedure comprises forwarding an RRC re-establishment request via the third node U03.

In one embodiment, the third message is an RRC message.

In one embodiment, the third message comprises UEAssistanceInformation.

In one embodiment, the third message comprises SidelinkUEInformation.

In one embodiment, the third message comprises FailureInformation.

In one embodiment, the third message comprises a UEInformationResponse.

In one embodiment, the third message comprises ulInformationTransfer.

In one embodiment, an RLC entity associated with the first-type bearer is an RLC entity of a Uu interface.

In one subembodiment, the RLC entity of a Uu interface corresponds to the RLC303 in Embodiment 3.

In one subembodiment, the RLC entity of a Uu interface corresponds to the RLC353 in Embodiment 353.

In one subembodiment, the RLC entity of a Uu interface is the Uu-RLC entity in figure (c) of the Embodiment 7.

In one embodiment, the second message uses the first bearer.

In one embodiment, the second message uses the second bearer.

In one embodiment, the second message uses the first-type bearer.

In one embodiment, the second message uses the second-type bearer.

In one embodiment, the second message uses neither the first bearer nor the second bearer.

In one embodiment, the third message uses the first bearer.

In one embodiment, the third message uses the second bearer.

In one embodiment, the third message uses neither the first bearer nor the second bearer.

In one embodiment, the third message uses the first-type bearer.

In one embodiment, the third message uses the second-type bearer.

In one embodiment, one of the first-type bearer and the second-type bearer is an MRB and the other is a DRB.

In one embodiment, the first bearer is for broadcast or groupcast services.

In one embodiment, the first bearer is a PTM branch of an MRB.

In one embodiment, the second bearer is for broadcast or groupcast services.

In one embodiment, the second bearer is for unicast services.

In one embodiment, the second bearer is for a PTP branch of broadcast or groupcast services.

In one embodiment, the first signaling comprises a first sub-signaling and a second sub-signaling, the first sub-signaling being used for configuring the first bearer, and the second sub-signaling being used for configuring the second bearer.

In one embodiment, the first information is FailureInformation; the third message is SidelinkUEInformationNR.

In one embodiment, the first information and the third message are both SidelinkUEInformationNR, where the first bearer is the second-type bearer.

In one embodiment, when the second bearer is detected to be invalid, there isn't any direct path available for the first cell group.

In one embodiment, the phrase that there isn't any direct path available for the first cell group means: the first bearer hasn't recovered from failure.

In one embodiment, the phrase that there isn't any direct path available for the first cell group means: The first node U01 is not configured with any direct path for the first cell group other than the first bearer.

In one embodiment, the phrase that there isn't any direct path available for the first cell group means: A radio link corresponding to the first bearer is released and the first node U01 is not configured with any direct path for the first cell group other than the first bearer.

In one embodiment, the first node U01, as a response to the action of detecting the invalidation of the first bearer, transmits the first information depending on whether the first bearer is the first-type bearer or the second-type bearer;

herein, the sentence of transmitting the first information depending on whether the first bearer is the first-type bearer or the second-type bearer means that: when the first bearer is the first-type bearer, initiating a failure information transmission procedure, the action of initiating the failure information transmission procedure including transmitting the first information; when the first bearer is the second-type bearer, initiating a transmission procedure of sidelink UE information for NR sidelink communication, the action of initiating the transmission procedure of sidelink UE information for NR sidelink communication including transmitting the first information.

Embodiment 6

Figure 6:
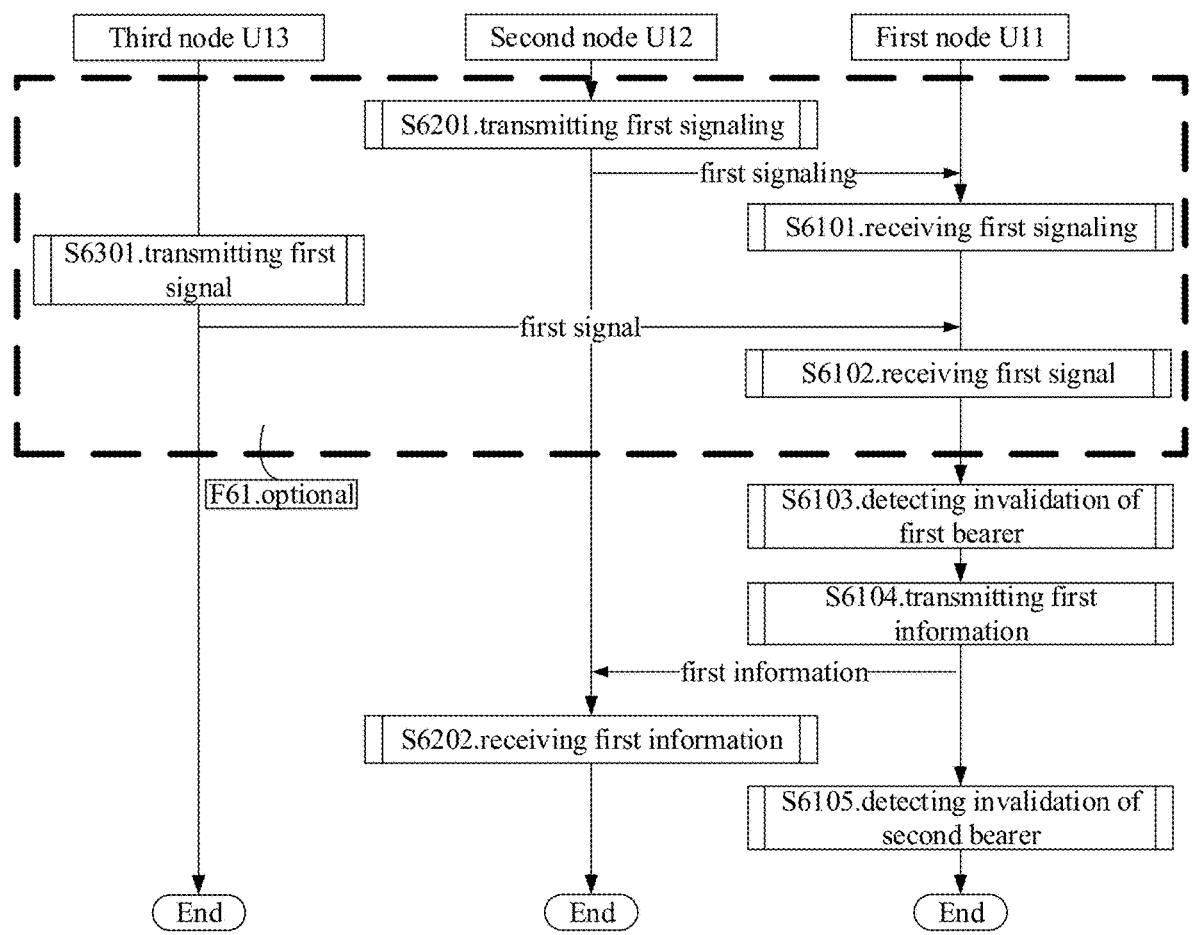
FIG. 6 illustrates a flowchart of radio signal transmission according to one embodiment of the present application.

Embodiment 6 illustrates a flowchart of signal transmission according to one embodiment of the present application, as shown in FIG. 6. In FIG. 6, U11 corresponds to the first node in the present application. It should be particularly noted that the sequence illustrated herein does not set any limit on the orders in which signals are transmitted and implementations in this present application. With Embodiment 5 as the foundation, the content necessary but not explained in Embodiment 6 can refer to Embodiment 5. Herein, steps in F61 are optional, and the step S6105 is optional, too.

The first node U11 receives a first signaling in step S6101; and receives a first signal in step S6102; detects invalidation of a first bearer in step S6103; transmits first information in step S6104; and detects invalidation of a second bearer in step S6105.

The second node U12 transmits a first signaling in step S6201; and receives first information in step S6201.

The third node U13 transmits a first signal in step S6301.

In one embodiment, the first node U11 is a U2N relay UE.

In one embodiment, the first node U11 is a U2N remote UE.

In one embodiment, the first node U11 is an NR ProSe U2N remote UE.

In one embodiment, a third node U13 is a L2 U2N relay UE.

In one embodiment, a third node U13 is a neighbor cell of the first node U11.

In one embodiment, a third node U13 and the second node U12 belong to a same CU.

In one embodiment, a third node U13 and the second node U12 belong to a same DU.

In one embodiment, a third node U13 and the second node U12 belong to a same gNB.

In one embodiment, the third node U13 and the second node U12 are respectively cells with different physical cell identities (PCIs).

In one embodiment, a third node U13 and the second node U12 are respectively cells within the first cell group.

In one embodiment, a third node U13 corresponds to another TRP of the second node U12.

In one embodiment, a third node U13 corresponds to another beam of the second node U12, corresponding to another group of CSI-RS reference signals.

In one embodiment, the second node U12 is a base station.

In one embodiment, the second node U12 is a primary cell (PCell) of the first node U11.

In one embodiment, the second node U12 is a master cell group (MCG) of the first node U11.

In one embodiment, the second node U12 corresponds to a first cell group in the present application or a base station corresponding to the first cell group.

In one embodiment, the first signaling is directly transmitted to the first node U11 by the second node U12 without being forwarded via relay.

In one embodiment, the first signaling is transmitted to the first node U11 by the second node U12 via the third node U13.

In one embodiment, the first signaling is transmitted using the first bearer.

In one embodiment, the first signaling is transmitted using the first-type bearer.

In one embodiment, the first signaling is transmitted using the second bearer.

In one embodiment, the first signaling is transmitted using the second-type bearer.

In one embodiment, the first signaling is transmitted using a bearer other than the first bearer and the second bearer.

In one embodiment, the first signaling comprises a first sub-signaling and a second sub-signaling, the first sub-signaling being used for configuring the first bearer, and the second sub-signaling being used for configuring the second bearer.

In one embodiment, the first signaling is used for configuring the first bearer and the second bearer of the first cell group; the second bearer being associated with the first cell group.

In one embodiment, the first bearer is the second-type bearer.

In one embodiment, the first bearer is a sidelink radio link between the first node U11 and the third node U13.

In one embodiment, the first bearer is a sidelink RLC bearer between the first node U11 and the third node U13.

In one embodiment, the first bearer is a channel between the first node U11 and the third node U13, used for forwarding data between the first node U11 and the second node U12.

In one embodiment, a protocol entity corresponding to the first bearer is in within the first node U11 and the third node U13.

In one embodiment, when performing the step S6103 of detecting invalidation of a first bearer, the second bearer is not invalid.

In one embodiment, when performing the step S6103 of detecting invalidation of a first bearer, the second bearer is available.

In one embodiment, the second bearer is the first-type bearer.

In one embodiment, the first information is transmitted to the second node U12 via the second bearer.

In one embodiment, the step S6105 of detecting invalidation of a second bearer is performed after the step S6103.

In one embodiment, when performing the step S6105 of detecting invalidation of a second bearer, the first bearer is not yet resumed.

In one embodiment, when performing the step S6105 of detecting invalidation of a second bearer, there does not exist the first-type bearer or the second-type bearer other than the first bearer and the second bearer.

In one embodiment, the first signaling is used for configuring a second bearer; the second bearer being associated with the first cell group; and invalidation of the second bearer is detected after the action of detecting the invalidation of the first bearer.

In one embodiment, the first node U11, as a response to the action of detecting the invalidation of the second bearer, initiates an RRC re-establishment procedure, and suspends an SRB1 along with the RRC re-establishment procedure, and performs either cell selection or relay selection; and transmits a third message, the third message being used to indicate the invalidation of the second bearer.

In one embodiment, the first bearer is the second-type bearer; the second bearer is the first-type bearer.

In one embodiment, an RLC entity associated with the first-type bearer is an RLC entity of a Uu interface; an RLC entity associated with the second bearer is an RLC entity of a PC5 interface.

In one embodiment, in step S6103, the action of detecting invalidation of the first bearer comprises: a radio link failure (RLF) occurring in the first bearer.

In one embodiment, in step S6103, the action of detecting invalidation of the first bearer comprises: a sidelink RLF occurring between the first node U01 and the third node U03.

In one embodiment, in step S6103, the action of detecting invalidation of the first bearer comprises: detecting a maximum number of times of HARQ DTX being reached on the first bearer.

In one embodiment, in step S6103, the action of detecting invalidation of the first bearer comprises: detecting a maximum number of times of RLC retransmission being reached on the first bearer.

In one embodiment, in step S6103, the action of detecting invalidation of the first bearer comprises: an RRC message compatibility failure occurring in the first bearer.

In one embodiment, in step S6103, the action of detecting invalidation of the first bearer comprises: a compatibility failure occurring in an RRC message on a PC5 interface between the first node U01 and the third node U03.

In one embodiment, in step S6103, the action of detecting invalidation of the first bearer comprises: the first bearer being released.

In one embodiment, in step S6103, the action of detecting invalidation of the first bearer comprises: a higher layer of the first node U01 indicating the invalidation of the first bearer.

In one embodiment, in step S6103, the action of detecting invalidation of the first bearer comprises: detecting expiration of a timer for the first bearer.

In one embodiment, in step S6103, the action of detecting invalidation of the first bearer comprises: detecting expiration of a timer T400 for the first bearer.

In one embodiment, in step S6103, the action of detecting invalidation of the first bearer comprises: detecting expiration of a timer T404 for the first bearer.

In one embodiment, in step S6103, the action of detecting invalidation of the first bearer comprises: detecting expiration of a timer for the first bearer, which is related to path switch.

In one embodiment, in step S6103, the action of detecting invalidation of the first bearer comprises: detecting a failure of a path switch for the first bearer.

In one embodiment, as a response to the step S6103 of detecting invalidation of the first bearer, the first node U11 executes the first operation set, where the first bearer is the second-type bearer.

In one subembodiment, the first operation comprises releasing an RLC entity associated with the first bearer.

In one subembodiment, the first operation comprises storing information for the invalidation of the first bearer in the first state variable.

In one subembodiment, the first operation does not comprise storing information for the invalidation of the first bearer in the first state variable.

In one subembodiment, the first operation comprises storing information for the invalidation of the first bearer in a variable other than the first state variable.

In one subembodiment, the first operation does not comprise storing information for the invalidation of the first bearer.

In one embodiment, the step S6103 of detecting invalidation of a second bearer comprises: detecting a radio link failure (RLF) occurring in the second bearer.

In one embodiment, the step S6103 of detecting invalidation of a second bearer comprises: detecting a radio link failure (RLF) occurring in a radio link between the first node U11 and the second node U12.

In one embodiment, the step S6103 of detecting invalidation of a second bearer comprises: detecting expiration of a timer T310.

In one embodiment, the step S6103 of detecting invalidation of a second bearer comprises: detecting expiration of a timer T312.

In one embodiment, the step S6103 of detecting invalidation of a second bearer comprises: detecting expiration of a timer T304.

In one embodiment, the step S6103 of detecting invalidation of a second bearer comprises: detecting an issue in a random access procedure for the second node U12.

In one embodiment, the step S6103 of detecting invalidation of a second bearer comprises: detecting an RLC maximum retransmission number being reached by the second bearer.

In one embodiment, the step S6103 of detecting invalidation of a second bearer comprises: detecting an occurrence of constant LBT failure.

In one embodiment, the step S6105 triggers that the first node U1f initiates an RRC re-establishment.

In one embodiment, the first signal is a signal in sidelink.

In one embodiment, the first signal is or includes a reference signal.

In one embodiment, the first signal is or includes a radio link in sidelink.

In one embodiment, the first signal is or includes data or a signaling in sidelink.

In one embodiment, the first signal is or includes a discovery signal in sidelink.

In one embodiment, the first signal is or includes an RRC message in sidelink.

In one embodiment, the first signal is or includes a notificationMessageSidelink.

In one embodiment, the first signal is or includes a signal used for releasing a link between the first node U11 and the third node U13.

In one embodiment, the first signal is or includes a DIRECT LINK RELEASE REQUEST.

In one embodiment, the first information indicates a mapping relation between an SRB1 of the first node U11 and the first bearer.

In one embodiment, the first information indicates a mapping relation between an SRB1 of the first node U11 and the second bearer.

Embodiment 7

Embodiment 7 illustrates a schematic diagram of a protocol stack of relay communications according to one embodiment of the present application, as shown in FIG. 7.

FIG. 7 consists of three figures, i.e., figure (a), figure (b) and figure (c).

The protocol stack shown in FIG. 7 is applicable to L2 U2N relay communications, with Embodiment 3 as the foundation of Embodiment 7.

in FIG. 7 corresponds to a user plane protocol stack in L2 U2N relay communications; (b) in FIG. 7 corresponds to a control plane protocol stack in L2 U2N relay communications.

In one embodiment, a first relay is a relay for the first node when using an indirect path.

In one embodiment, a first relay is a L2 U2N relay UE between the first node and the first cell group.

In one embodiment, a gNB in FIG. 7 is a gNB in the first cell group.

In one embodiment, a gNB in FIG. 7 is a gNB corresponding to the first cell group.

In one embodiment, a gNB in FIG. 7 is a gNB corresponding to a PCell in the first cell group.

In one embodiment, a gNB in FIG. 7 belongs to the first cell group.

In Embodiment 7, a PC5 interface is an interface between the first node and the first relay, where protocol entities related to the PC5 interface {PC5-SRAP, PC5-RLC, PC5-MAC, PC5-PHY} terminate at the first node and the first relay; a Uu interface is an interface between a UE and a gNB, where protocol entities of the Uu interface respectively terminate at the UE and the gNB.

In one embodiment, the first relay is a U2N relay UE, and before executing the first signaling, the first relay provides L2 U2N relay service to the first node.

In one embodiment, the first node and the first relay are UEs.

In one embodiment, the gNB shown in FIG. 7 corresponds to the second node in the present application.

In one embodiment, protocol entities of a Uu interface {Uu-SRAP, Uu-RLC, Uu-MAC, Uu-PHY} terminate at the first relay and the gNB.

In one embodiment, as shown in (a), protocol entities of a Uu interface {Uu-SDAP, Uu-PDCP} terminate at the first node and the gNB; an SDAP PDU and a PDCP PDU of the first node are forwarded by the first relay, but the first relay does not modify the SDAP PDU and the PDCP PDU, which means that the SDAP PDU and the PDCP PDU transmitted to the gNB by the first node are transparent to the first relay.

In one embodiment, as shown in (b), protocol entities of a Uu interface {Uu-RRC, Uu-PDCP} terminate at the first node and the gNB; an RRC PDU and a PDCP PDU of the first node are forwarded by the first relay, but the first relay does not modify the RRC PDU and the PDCP PDU, which means that the RRC PDU and the PDCP PDU transmitted to the gNB by the first node are transparent to the first relay.

In one embodiment, as shown in (a), PC5-SRAP corresponds to SRAP357 in FIG. 3, PC5-RLC corresponds to RLC353 in FIG. 3, PC5-MAC corresponds to MAC352 in FIG. 3, and PC5-PHY corresponds to PHY351 in FIG. 3.

In one embodiment, as shown in (a), Uu-SDAP corresponds to SDAP356 in FIG. 3, and Uu-PDCP corresponds to PDCP354 in FIG. 3.

In one embodiment, as shown in (b), PC5-SRAP corresponds to SRAP307 in FIG. 3, PC5-RLC corresponds to RLC303 in FIG. 3, PC5-MAC corresponds to MAC302 in FIG. 3, and PC5-PHY corresponds to PHY301 in FIG. 3.

In one embodiment, as shown in (b), Uu-RRC corresponds to RRC306 in FIG. 3, and Uu-PDCP corresponds to PDCP304 in FIG. 3.

In one embodiment, a cell of the gNB in FIG. 7 is a PCell of the first relay, the first relay being in an RRC connected state.

In one embodiment, the first cell group is an MCG of the first relay.

In one embodiment, a PC5-SRAP is only used for a specific RB or message or specific data.

In one subembodiment, when the first relay forwards system information of the gNB, the PC5-SRAP layer is not used.

In one embodiment, as shown in FIG. 7, communications between the first node and the gNB use an indirect path.

In one embodiment, as shown in FIG. 7, communications between the first node and the gNB use a direct path.

In one embodiment, as shown in FIG. 7, communications between the first node and the gNB use a direct path and an indirect path simultaneously.

In one embodiment, the first signaling is generated by Uu-RRC of the gNB given in FIG. 7(b) and received by Uu-RRC of the first node.

In one embodiment, the first signaling is transparent to the first relay.

In one embodiment, the first information is forwarded to a gNB by the first relay.

In one embodiment, the first information is directly transmitted to a gNB without being forwarded by relay.

In one embodiment, when using an indirect path, Uu-PDCP of the first node is associated with PC5-RLC, or is associated with PC5-RLC via PC5-SRAP.

In one embodiment, when using a direct path, the first node will establish Uu-RLC, and Uu-PDCP of the first node is associated with the Uu-RLC.

In one subembodiment, after switching to the direct path, the first node releases PC5-RLC.

In one subembodiment, after switching to the direct path, the first node releases PC5-SRAP.

In one subembodiment, after switching to the direct path, the first node releases PC5-MAC and PC5-PHY.

In one subembodiment, after switching to the direct path, the first node no longer uses PC5-SRAP.

In one subembodiment, after switching to the direct path, there is no other protocol layer between Uu-PDCP and Uu-RLC of the first node.

In one embodiment, the second-type bearer is a radio link between the first node and the first relay in (a) and/or (b) of FIG. 7.

In one embodiment, the second-type bearer is a sidelink radio link between the first node and the first relay in (a) and/or (b) of FIG. 7.

In one embodiment, the second-type bearer is a sidelink RLC bearer between the first node and the first relay in (a) and/or (b) of FIG. 7.

In one embodiment, the second-type bearer is a transmission channel between the first node and the first relay in (a) and/or (b) of FIG. 7.

In one embodiment, the second-type bearer is a logical channel between the first node and the first relay in (a) and/or (b) of FIG. 7.

In one embodiment, the second-type bearer is a physical channel between the first node and the first relay in (a) and/or (b) of FIG. 7.

In one embodiment, the second-type bearer is a direct unicast link between the first node and the first relay in (a) and/or (b) of FIG. 7.

In one embodiment, the second-type bearer is an interface between PC5-SRAP entities between the first node and the first relay in (a) and/or (b) of FIG. 7.

In one embodiment, the second-type bearer is a PC5 interface between the first node and the first relay in (a) and/or (b) of FIG. 7.

In one embodiment, (c) in FIG. 7 is a protocol stack for communications between the first node and the gNB when relay is not used.

In one embodiment, (c) in FIG. 7 is a protocol stack for communications between the first node and the gNB when relay is not used, even if a direct path is used.

In one embodiment, the first-type bearer is a radio bearer between the first node and the gNB illustrated in (c) of FIG. 7.

In one embodiment, the first-type bearer is a radio link between the first node and the gNB illustrated in (c) of FIG. 7.

In one embodiment, the first-type bearer is an RLC bearer between the first node and the gNB illustrated in (c) of FIG. 7.

In one embodiment, the first-type bearer is a channel between the first node and the gNB illustrated in (c) of FIG. 7.

In one embodiment, the first-type bearer is a logical channel between the first node and the gNB illustrated in (c) of FIG. 7.

In one embodiment, the first-type bearer is a physical channel between the first node and the gNB illustrated in (c) of FIG. 7.

In one embodiment, the first-type bearer is a Uu interface between the first node and the gNB illustrated in (c) of FIG. 7.

Embodiment 8

Embodiment 8 illustrates a schematic diagram of topological structure according to one embodiment of the present application, as shown in FIG. 8.

The topological structure and the definitions of the first-type bearer and the second-type bearer in Embodiment 8 are applicable to other Embodiments, including the Embodiment 5.

A first node in Embodiment 8 corresponds to the first node in the present application.

In one embodiment, a second node in Embodiment 8 corresponds to a first cell group in the present application.

In one embodiment, a second node in Embodiment 8 corresponds to a primary cell (PCell) in a first cell group in the present application.

In one embodiment, a second node in Embodiment 8 corresponds to a gNB corresponding to a first cell group in the present application.

In one embodiment, a second node in Embodiment 8 corresponds to a PCell of the first node in the present application.

In one embodiment, a second node in Embodiment 8 corresponds to a transmitting point of a Master Cell Group (MCG) of the first node in the present application.

In one embodiment, a third node in Embodiment 8 is a relay node of the first node.

In one embodiment, a third node in Embodiment 8 is a relay node relaying the first node and the second node.

In one embodiment, a third node in Embodiment 8 is a L2 U2N relay UE of the first node.

In one embodiment, a third node in Embodiment 8 is a SCell of the first cell group.

In one embodiment, a third node in Embodiment 8 is a transmitting point of the first cell group.

In one embodiment, a third node in Embodiment 8 is a cell other than a PCell.

In one embodiment, a third node in Embodiment 8 is a neighbor cell.

In one embodiment, a third node in Embodiment 8 is a Repeater in the first cell group.

In one embodiment, a third node in Embodiment 8 is a node of TN.

In one embodiment, a third node in Embodiment 8 is a node of NTN.

In one embodiment, the first-type bearer refers to a bearer between the first node and the second node.

In one embodiment, the first-type bearer refers to a radio link between the first node and the second node.

In one embodiment, the first-type bearer refers to an RLC bearer between the first node and the second node.

In one embodiment, the first-type bearer refers to a communication link between the first node and the second node.

In one embodiment, the first-type bearer refers to a channel between the first node and the second node.

In one embodiment, the first-type bearer refers to a communication interface between the first node and the second node.

In one embodiment, the first-type bearer is unrelated to relay.

In one embodiment, the second-type bearer is related to relay.

In one embodiment, the second-type bearer is a bearer between the first node and the third node.

In one embodiment, the second-type bearer is a sidelink radio link between the first node and the third node.

In one embodiment, the second-type bearer is a communication link between the first node and the third node.

In one embodiment, the second-type bearer is a communication interface between the first node and the third node.

In one embodiment, the second-type bearer is a sidelink RLC bearer between the first node and the third node.

In one embodiment, the second-type bearer is a channel between the first node and the third node.

In one embodiment, the second-type bearer is a bearer going through the third node, between the first node and the second node.

In one embodiment, the second-type bearer is a communication link going through the third node, between the first node and the second node.

In one embodiment, the second-type bearer includes a sidelink RLC bearer between the first node and the third node and an RLC bearer between the third node and the second node.

In one embodiment, the second-type bearer includes a channel between the first node and the third node and a channel between the third node and the second node.

In one embodiment, the second-type bearer includes a sidelink radio link between the first node and the third node and a radio link between the third node and the second node.

In one embodiment, the first-type bearer is a direct path.

In one embodiment, a link not being forwarded through the third node between the first node and the second node is a direct path.

In one embodiment, a link being forwarded through the third node between the first node and the second node is an indirect path.

In one embodiment, a direct path is a way or a transmission path in which the first node and the second node are in communication without being through the third node.

In one embodiment, an indirect path is a way or a transmission path in which the first node and the second node are in communication through the third node.

In one embodiment, the first-type bearer is or belongs to a direct path.

In one embodiment, the second-type bearer is an indirect path.

In one embodiment, the first-type bearer and the second-type bearer are both for the first node.

In one embodiment, the first-type bearer and the second-type bearer are both for data transmissions of the first node and the second node.

In one embodiment, the second-type bearer includes a transmission path between the first node and the third node as well as between the third node and the second node.

In one subembodiment, the first bearer is the second-type bearer, the action of detecting invalidation of a first bearer referring to detecting invalidation of any segment between the first node and the third node, or between the third node and the second node.

In one subembodiment, the second bearer is the second-type bearer, the action of detecting invalidation of the second bearer referring to detecting invalidation of any segment between the first node and the third node, or between the third node and the second node.

In one embodiment, the invalidation of the second-type bearer includes invalidation of a direct link between the first node and the third node.

In one embodiment, the invalidation of the second-type bearer includes a direct link between the first node and the third node being released.

In one embodiment, detecting invalidation of the second-type bearer includes not accepting feedback of the third node for keep alive.

In one embodiment, the second-type bearer includes a direct link between the first node and the third node.

In one embodiment, the second-type bearer includes a PC5 direct link between the first node and the third node.

Embodiment 9

Embodiment 9 illustrates a schematic diagram of first information being used to indicate invalidation of a first bearer according to one embodiment of the present application, as shown in FIG. 9.

In one embodiment, the first information explicitly indicates invalidation of the first bearer.

In one embodiment, the first information implicitly indicates invalidation of the first bearer.

In one embodiment, the first information explicitly indicates a cause of invalidation of the first bearer.

In one embodiment, the first information explicitly indicates a type of invalidation of the first bearer.

In one embodiment, transmitting the first information indicates invalidation of the second bearer.

In one embodiment, the first information is one or more fields in an RRC message.

In one embodiment, the first information is one or more information elements in an RRC message.

In one embodiment, the first information indicates an identity of the first bearer.

In one embodiment, the first information indicates a logical channel identity of the first bearer.

In one embodiment, the first information indicates a cell group identity of the first bearer.

In one embodiment, the first information indicates a cell identity of the first bearer.

In one embodiment, the first information indicates a time when the first bearer is invalid.

In one embodiment, the first information indicates whether the first bearer is the first-type bearer.

In one embodiment, the first information indicates whether the first bearer is the second-type bearer.

In one embodiment, resources occupied by the first information indicate whether the first bearer is the first-type bearer or the second-type bearer.

In one embodiment, a bearer occupied by the first information indicates whether the first bearer is the first-type bearer or the second-type bearer.

In one embodiment, when the first information is transmitted on the first-type bearer, the first information indicates invalidation of the second-type bearer.

In one embodiment, when the first information is transmitted on the second-type bearer, the first information indicates invalidation of the first-type bearer.

In one embodiment, the first information indicates an identity of a relay of the first node.

In one subembodiment, the first bearer is the first-type bearer.

In one subembodiment, the first bearer is the second-type bearer.

In one embodiment, when the first bearer is the first-type bearer, the first information indicates rlc-failure.

In one embodiment, when the first bearer is the second-type bearer, the first information indicates sl-rlc-failure.

In one embodiment, the first information comprises a failureType field.

In one embodiment, the first information indicates a logical channel identity corresponding to the first bearer.

In one embodiment, the first information indicates a temporary identity of the first node, the temporary identity being an identity in an SRAP layer of the first node.

In one subembodiment, the first bearer is the first-type bearer.

In one subembodiment, the first bearer is the second-type bearer.

Embodiment 10

Embodiment 10 illustrates a schematic diagram of first information being used to indicate whether a first bearer is a second-type bearer according to one embodiment of the present application, as shown in FIG. 10.

In one embodiment, the first information explicitly indicates whether the first bearer is the second-type bearer.

In one embodiment, the first information explicitly indicates that the first bearer is the first-type bearer, when the first information does not indicate that the first bearer is the first-type bearer, the first bearer is the second-type bearer.

In one embodiment, a field in the first information explicitly indicates whether the first bearer is the second-type bearer.

In one embodiment, the first information indicates that the first bearer is the second-type bearer by indicating an indirect path.

In one embodiment, the first information indicates that the first bearer is the second-type bearer by indicating a L2 U2N relay UE.

In one embodiment, the first information indicates that the first bearer is the second-type bearer by indicating a configuration index of an indirect path.

In one embodiment, the first information indicates that the first bearer is the second-type bearer by indicating a configuration index used for relaying.

In one embodiment, the first information indicates that the first bearer is the second-type bearer by indicating a sidelink configuration index used for relaying.

In one embodiment, the first information indicates that the first bearer is the second-type bearer by indicating a configuration used for a PC5 interface.

In one embodiment, the first information indicates that the first bearer is the second-type bearer by indicating an RLC entity associated with the first bearer.

In one embodiment, the first information indicates that the first bearer is the second-type bearer by indicating the type of an RLC entity associated with the first bearer.

In one embodiment, the first information indicates that the first bearer is the second-type bearer by indicating a logical channel associated with the first bearer.

In one embodiment, the first information indicates that the first bearer is the second-type bearer by indicating a specific failure type.

In one embodiment, the first information indicates that the first bearer is the second-type bearer by indicating the cause or the type of invalidation of the first bearer.

Embodiment 11

Embodiment 11 illustrates a schematic diagram of a third message being used to indicate invalidation of a second bearer according to one embodiment of the present application, as shown in FIG. 11.

In one embodiment, the third message is an uplink message.

In one embodiment, the third message is an RRC message.

In one embodiment, at least one field in the third message indicates invalidation of the second bearer.

In one embodiment, the third message explicitly indicates invalidation of the second bearer.

In one embodiment, the third message implicitly indicates invalidation of the second bearer.

In one embodiment, transmitting the third message indicates invalidation of the second bearer.

In one embodiment, resources occupied by the third message indicates invalidation of the second bearer.

In one embodiment, a bearer used by the third message indicates invalidation of the second bearer.

In one embodiment, the third message being transmitted using the first bearer indicates invalidation of the second bearer.

In one embodiment, the third message indicates invalidation of the second bearer by indicating an identity of the second bearer.

In one embodiment, the third message indicates invalidation of the second bearer by indicating a configuration index of the second bearer.

In one embodiment, the third message indicates invalidation of the second bearer by indicating a logical channel identity associated with or corresponding to the second bearer.

In one embodiment, the third message indicates invalidation of the second bearer by indicating an interface associated with or corresponding to the second bearer.

In one embodiment, the third message indicates invalidation of the second bearer by indicating an index of the second bearer.

In one embodiment, the third message indicates invalidation of the second bearer by indicating a transmission path associated with or corresponding to the second bearer.

In one embodiment, the third message indicates invalidation of the second bearer by indicating an indirect path.

In one embodiment, the third message indicates invalidation of the second bearer by indicating a L2 U2N relay UE of the first node.

In one embodiment, the third message indicates invalidation of the second bearer by indicating a candidate relay.

In one embodiment, the third message indicates invalidation of the second bearer by indicating a measurement result of a L2 U2N relay UE of the first node.

In one embodiment, the third message indicates invalidation of the second bearer by indicating a measurement report or a triggering event in sidelink associated with the second bearer being satisfied.

In one embodiment, the third message indicates invalidation of the second bearer by indicating a temporary identity associated with the second bearer.

Embodiment 12

Figure 12:
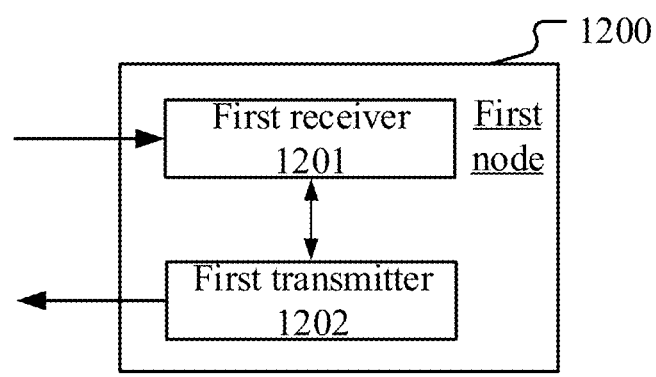
FIG. 12 illustrates a structure block diagram of a processing device in a first node according to one embodiment of the present application.

FIG. 12 illustrates a structure block diagram of a processing device used in a first node according to one embodiment of the present application; as shown in FIG. 12. In FIG. 12, a processing device 1200 in a first node is comprised of a first receiver 1201 and a first transmitter 1202. In Embodiment 12, the first receiver 1201 detects invalidation of a first bearer; the first bearer being associated with a first cell group; and as a response to the action of detecting invalidation of a first bearer, executes a first operation set, the first operation set being related to a type of the first bearer; and the first transmitter 1202 transmits first information as a response to the action of detecting invalidation of a first bearer; the first information being used to indicate the invalidation of the first bearer; and transmits a second message as a response to all conditions in a first condition set being satisfied; the second message indicating existence of available information;

herein, the first cell group is a Master Cell Group (MCG); the first condition set comprises a first state variable storing the available information; the sentence of the first operation set being related to a type of the first bearer means that when the first bearer is a first-type bearer, the first operation set comprises at least one of re-establishing an RLC entity associated with the first bearer or storing information for the invalidation of the first bearer in the first state variable; when the first bearer is a second-type bearer, the first operation set comprises at least releasing an RLC entity associated with the first bearer.

In one embodiment, the first transmitter 1202 transmits the first information on a second bearer; the second bearer being associated with the first cell group; one of the first bearer and the second bearer is the first-type bearer while the other is the second-type bearer;

herein, an RLC entity associated with the first-type bearer is an RLC entity of a Uu interface; an RLC entity associated with the second-type bearer is an RLC entity of a PC5 interface; the first-type bearer uses a primary link; the second-type bearer uses a sidelink.

In one embodiment, an SRB1 of the first node 1200 is simultaneously associated with the first bearer and the second bearer; the first node 1200 is only configured with one cell group.

In one embodiment, the first operation set comprises reconfiguring medium access control (MAC) associated with the first bearer; the first-type bearer is an RLC bearer, while the second-type bearer is a sidelink RLC bearer.

In one embodiment, the first bearer is the first-type bearer; the action of storing information for the invalidation of the first bearer in the first state variable comprises storing a cause of the invalidation of the first bearer and whether a second-type bearer is used; the cause of the invalidation of the first bearer belongs to a first candidate cause set, the first candidate cause set comprising a radio link failure (RLF), a cell handover failure (HOF) and a path switch failure.

In one embodiment, the first receiver 1201 receives a first signaling, the first signaling being used to configure a second bearer; one of the first bearer and the second bearer is the first-type bearer while the other is the second-type bearer; the second bearer being associated with the first cell group;

the first transmitter 1202, before transmitting the first information, configures a primary path of a PDCP entity of an SRB1 as for the second bearer;

herein, the first signaling indicates that an SRB1 is simultaneously associated with the first bearer and the second bearer, and that a primary path of the PDCP entity of the SRB1 is for the first bearer; the SRB1 is not configured with PDCP duplication; the first information comprises a first measurement result; the first information is used to indicate whether the first bearer is the second-type bearer.

In one embodiment, the first receiver 1201 receives a first signaling, the first signaling being used to configure a second bearer; the second bearer being associated with the first cell group; and detects invalidation of the second bearer after the action of detecting the invalidation of the first bearer; and the first transmitter 1202, as a response to the action of detecting the invalidation of the second bearer, initiates an RRC re-establishment procedure, and suspends an SRB1 along with the RRC re-establishment procedure, and performs either cell selection or relay selection; and transmits a third message, the third message being used to indicate the invalidation of the second bearer;

herein, the first bearer is the first-type bearer; the second bearer is the second-type bearer; while the invalidation of the second bearer is detected, the first bearer is not yet resumed; an RLC entity associated with the first-type bearer is an RLC entity of a Uu interface; an RLC entity associated with the second bearer is an RLC entity of a PC5 interface.

In one embodiment, the first receiver 1201 receives a first signaling, the first signaling being used to configure a second bearer; the second bearer being associated with the first cell group; and detects invalidation of the second bearer after the action of detecting the invalidation of the first bearer; and the first transmitter 1202, as a response to the action of detecting the invalidation of the second bearer, initiates an RRC re-establishment procedure, and suspends an SRB1 along with the RRC re-establishment procedure, and performs either cell selection or relay selection; and transmits a third message, the third message being used to indicate the invalidation of the second bearer;

herein, the first bearer is the second-type bearer; the second bearer is the first-type bearer; while the invalidation of the second bearer is detected, the first bearer is not yet resumed; an RLC entity associated with the first-type bearer is an RLC entity of a Uu interface; an RLC entity associated with the second bearer is an RLC entity of a PC5 interface.

In one embodiment, the first transmitter 1202, as a response to the action of detecting the invalidation of the first bearer, transmits the first information depending on whether the first bearer is the first-type bearer or the second-type bearer;

herein, the sentence of transmitting the first information depending on whether the first bearer is the first-type bearer or the second-type bearer means that: when the first bearer is the first-type bearer, initiating a failure information transmission procedure, the action of initiating the failure information transmission procedure including transmitting the first information; when the first bearer is the second-type bearer, initiating a transmission procedure of sidelink UE information for NR sidelink communication, the action of initiating the transmission procedure of sidelink UE information for NR sidelink communication including transmitting the first information.

In one embodiment, the first node is a UE.

In one embodiment, the first node is a terminal supporting large delay difference.

In one embodiment, the first node is a terminal supporting NTN.

In one embodiment, the first node is an aircraft or vessel.

In one embodiment, the first node is a cellphone or vehicle-mounted terminal.

In one embodiment, the first node is a relay UE and/or a U2N remote UE.

In one embodiment, the first node is an IoT terminal or IIoT terminal.

In one embodiment, the first node is a piece of equipment supporting transmissions with low delay and high reliability.

In one embodiment, the first node is a sidelink communication node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver, detecting invalidation of a first bearer, the first bearer being associated with a first cell group; and as a response to the action of detecting invalidation of the first bearer, executing a first operation set, the first operation set being related to a type of the first bearer; and
a first transmitter, transmitting first information as the response to the action of detecting invalidation of the first bearer, the first information being used to indicate the invalidation of the first bearer, and
transmitting a second message as a response to all conditions in a first condition set being satisfied, the second message indicating existence of available information,
wherein the first cell group is a Master Cell Group (MCG);
the first condition set comprises a first state variable storing the available information;
the first operation set being related to a type of the first bearer comprises as follows;
when the first bearer is a first-type bearer, the first operation set comprises at least one of re-establishing an Radio link Control (RLC) entity associated with the first bearer or storing information for the invalidation of the first bearer in the first state variable;
when the first bearer is a second-type bearer, the first operation set comprises at least releasing an RLC entity associated with the first bearer,
wherein the transmitting the first information occurs on a second bearer,
wherein the second bearer is associated with the first cell group,
wherein the first bearer is the second-type bearer using a sidelink, and the second bearer is the first-type bearer using a primary link,
wherein an RLC entity associated with the first-type bearer is an RLC entity of a Uu interface, an RLC entity associated with the second-type bearer is an RLC entity of a PC5 interface,
wherein a signaling radio bearer 1 (SRB1) of the first node is simultaneously associated with the first bearer and the second bearer.

2. The first node according to claim 1, the first node is only configured with one cell group.

3. The first node according to claim 1, characterized in that the first operation set comprises reconfiguring medium access control (MAC) associated with the first bearer; the first-type bearer is an RLC bearer, while the second-type bearer is a sidelink RLC bearer.

4. The first node according to claim 3, characterized in that
when the first bearer is a second-type bearer, the first operation set does not comprise re-establishing an RLC entity associated with the first bearer.

5. The first node according to claim 1, characterized in comprising: the first transmitter, as a response to the action of detecting the invalidation of the first bearer, transmitting the first information depending on whether the first bearer is the first-type bearer or the second-type bearer; wherein the sentence of transmitting the first information depending on whether the first bearer is the first-type bearer or the second-type bearer means that: when the first bearer is the first-type bearer, initiating a failure information transmission procedure, the action of initiating the failure information transmission procedure including transmitting the first information; when the first bearer is the second-type bearer, initiating a sidelink UE information transmission procedure for New Radio (NR) sidelink communications, the action of initiating a sidelink UE information transmission procedure for NR sidelink communications including transmitting the first information.

6. The first node according to claim 1, characterized in that when the first bearer is a second-type bearer, the first operation set does not comprise re-establishing an RLC entity associated with the first bearer.

7. The first node according to claim 6, characterized in that
the phrase of the first bearer being associated with a first cell group means that: there is a mapping relation between at least an SRB1 between the first node and the first cell group and the first bearer;
wherein the first bearer is the first-type bearer.

8. The first node according to claim 1, characterized in that
the first bearer is the first-type bearer; the action of storing information for the invalidation of the first bearer in the first state variable comprises storing a cause for the invalidation of the first bearer and whether a second-type bearer is used; the cause for the invalidation of the first bearer belongs to a first candidate cause set, the first candidate cause set comprising a radio link failure (RLF), a cell handover failure (HOF) and a path switch failure.

9. The first node according to claim 1, characterized in that
the first-type bearer is a signaling radio bearer (SRB); the second-type bearer is a data radio bearer (DRB).

10. The first node according to claim 1, characterized in comprising:
the first receiver, receiving a first signaling, the first signaling being used to configure a second bearer; the second bearer being associated with the first cell group; and detecting invalidation of the second bearer after the action of detecting the invalidation of the first bearer; and
the first transmitter, as a response to the action of detecting the invalidation of the second bearer, initiating a radio resource control (RRC) re-establishment procedure, and along with the RRC re-establishment procedure, suspending an SRB 1, and performing either cell selection or relay selection; and transmitting a third message, the third message being used to indicate the invalidation of the second bearer;
wherein the first bearer is the first-type bearer; the second bearer is the second-type bearer; while the invalidation of the second bearer is detected, the first bearer is not yet resumed; an RLC entity associated with the first-type bearer is an RLC entity of a Uu interface; an RLC entity associated with the second bearer is an RLC entity of a PC5 interface.

11. The first node according to claim 1, characterized in comprising:
the first receiver, receiving a first signaling, the first signaling being used to configure a second bearer;
the second bearer being associated with the first cell group; and detecting invalidation of the second bearer after the action of detecting the invalidation of the first bearer; and
the first transmitter, as a response to the action of detecting the invalidation of the second bearer, initiating an RRC re-establishment procedure, and suspending an SRB1, and performing either cell selection or relay selection; and transmitting a third message, the third message being used to indicate the invalidation of the second bearer;
wherein the first bearer is the second-type bearer; the second bearer is the first-type bearer; while the invalidation of the second bearer is detected, the first bearer is not yet resumed; an RLC entity associated with the first-type bearer is an RLC entity of a Uu interface; an RLC entity associated with the second bearer is an RLC entity of a PC5 interface.

12. The first node according to claim 1, characterized in comprising:
the first transmitter, as a response to the action of detecting the invalidation of the first bearer, transmitting the first information depending on whether the first bearer is the first-type bearer or the second-type bearer;
wherein the sentence of transmitting the first information depending on whether the first bearer is the first-type bearer or the second-type bearer means that: when the first bearer is the first-type bearer, initiating a failure information transmission procedure, the action of initiating the failure information transmission procedure including transmitting the first information; when the first bearer is the second-type bearer, initiating a sidelink UE information transmission procedure for NR sidelink communications, the action of initiating a sidelink UE information transmission procedure for NR sidelink communications including transmitting the first information.

13. The first node according to claim 12, characterized in that
when the first bearer is a second-type bearer, the first operation set does not comprise re-establishing an RLC entity associated with the first bearer.

14. The first node according to claim 1, characterized in that
when the first bearer is the second-type bearer, the first operation set does not comprise re-establishing an RLC entity associated with the first bearer.

15. The first node according to claim 14, characterized in that
the phrase of the first bearer being associated with a first cell group means that: there is a mapping relation between at least an SRB1 between the first node and the first cell group and the first bearer;
wherein the first bearer is the first-type bearer.

16. The first node according to claim 1, characterized in that
when the first bearer is the second-type bearer, the first operation set does not comprise storing information for the invalidation of the first bearer in the first state variable.

17. The first node according to claim 1, characterized in comprising:
the first receiver, detecting invalidation of a second bearer;
wherein the second bearer is associated with the first cell group, the second bearer being the first-type bearer, and the action of detecting invalidation of a second bearer being used to trigger initiation of an RRC re-establishment; detecting the invalidation of the second bearer comprises: one of detecting a radio link failure (RLF) in the second bearer or detecting an expiration of a T310 or detecting an RLC maximum retransmission number reached by the second bearer.

18. The first node according to claim 17, characterized in that
the first information is generated by RRC, while the first message is transmitted only using the second bearer.

19. A method in a first node for wireless communications, comprising:
detecting invalidation of a first bearer, the first bearer being associated with a first cell group; and
as a response to the action of detecting invalidation of the first bearer, executing a first operation set, the first operation set being related to a type of the first bearer; and transmitting first information as the response to the action of detecting invalidation of the first bearer, the first information being used to indicate the invalidation of the first bearer; and transmitting a second message as a response to all conditions in a first condition set being satisfied, the second message indicating existence of available information, wherein the first cell group is a Master Cell Group (MCG);

the first condition set comprises a first state variable storing the available information;

the first operation set being related to a type of the first bearer comprises as follows;

when the first bearer is a first-type bearer, the first operation set comprises at least one of re-establishing an Radio link Control (RLC) entity associated with the first bearer or storing information for the invalidation of the first bearer in the first state variable;

when the first bearer is a second-type bearer, the first operation set comprises at least releasing an RLC entity associated with the first bearer, wherein the transmitting the first information occurs on a second bearer, wherein the second bearer is associated with the first cell group, wherein the first bearer is the second-type bearer using a sidelink, and the second bearer is the first-type bearer using a primary link, wherein an RLC entity associated with the first-type bearer is an RLC entity of a Uu interface, an RLC entity associated with the second-type bearer is an RLC entity of a PC5 interface, wherein a signaling radio bearer 1 (SRB1) of the first node is simultaneously associated with the first bearer and the second bearer.

* * * * *